US012505774B2

(12) United States Patent
Lee

(10) Patent No.: US 12,505,774 B2
(45) Date of Patent: Dec. 23, 2025

(54) GATE DRIVER AND DISPLAY DEVICE INCLUDING THE SAME

(71) Applicant: Samsung Display Co., LTD., Yongin-si (KR)

(72) Inventor: Gichang Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/917,416

(22) Filed: Oct. 16, 2024

(65) Prior Publication Data

US 2025/0140146 A1 May 1, 2025

(30) Foreign Application Priority Data

Oct. 27, 2023 (KR) ........................ 10-2023-0146107

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2320/04* (2013.01)

(58) Field of Classification Search
CPC ............. G09G 3/20; G09G 2310/0267; G09G 2310/0286; G09G 2320/04
See application file for complete search history.

(56) References Cited

U.S. PATENT DOCUMENTS

| | | | | |
|---|---|---|---|---|
| 8,305,329 B2 * | 11/2012 | Chen | G09G 3/3677 345/100 |
| 2010/0073065 A1 * | 3/2010 | Chen | G09G 3/3677 327/365 |
| 2011/0043511 A1 * | 2/2011 | Hsueh | G09G 3/3677 345/212 |
| 2019/0096306 A1 * | 3/2019 | Kong | G09G 3/20 |

FOREIGN PATENT DOCUMENTS

KR 20-0223343 Y1 5/2001

* cited by examiner

*Primary Examiner* — Sejoon Ahn
(74) *Attorney, Agent, or Firm* — Womble Bond Dickinson (US) LLP

(57) ABSTRACT

A gate driver includes a plurality of stages, each including: a first transistor including a first electrode, and a second electrode connected to a first control node; a third transistor including a first electrode connected to the first control node; and a second electrode connected to a second control node; a fifth transistor including a gate electrode connected to an inverting control node, and a second electrode connected to a gate output node; a sixth transistor including a gate electrode connected to the second control node, and a second electrode connected to the gate output node; a seventh transistor including a first electrode, and a second electrode connected to the first control node; and an eighth transistor including a gate electrode to receive an aging signal, a first electrode to receive an aging voltage, and a second electrode connected to the first electrode of the first transistor.

25 Claims, 20 Drawing Sheets

GATE DRIVER AND DISPLAY DEVICE INCLUDING THE SAME

CROSS-REFERENCE TO RELATED APPLICATION

The present application claims priority to and the benefit of Korean Patent Application No. 10-2023-0146107, filed on Oct. 27, 2023, in the Korean Intellectual Property Office (KIPO), the entire disclosure of which is incorporated by reference herein.

BACKGROUND

1. Field

Aspects of embodiments of the present disclosure relate to a gate driver and a display device including the same. More particularly, aspects of embodiments of the present disclosure relate to a gate driver and a display device for preventing or substantially preventing a leakage current of a transistor to improve a reliability.

2. Description of the Related Art

Generally, a display device may include a display panel and a display panel driver. The display panel may include gate lines, data lines, and pixel circuits. The display panel driver may include a gate driver for providing gate signals to the gate lines, a data driver for providing a data voltage to the data lines, and a driving controller for controlling the gate driver and the data driver.

Depending on a level of a voltage applied to transistors of the gate driver, a leakage current may flow through some of the transistors. When the leakage current flows in the gate driver, a reliability of the gate driver may decrease.

The above information disclosed in this Background section is for enhancement of understanding of the background of the present disclosure, and therefore, it may contain information that does not constitute prior art.

SUMMARY

Embodiments of the present disclosure may be directed to a gate driver with improved reliability.

Embodiments of the present disclosure may be directed to a display device including the gate driver.

According to one or more embodiments of the present disclosure, a gate driver includes a plurality of stages, each of the plurality of stages including: a first transistor including: a gate electrode configured to receive a clock signal; a first electrode configured to receive an input signal; and a second electrode connected to a first control node; a third transistor including: a gate electrode configured to receive a low gate voltage; a first electrode connected to the first control node; and a second electrode connected to a second control node; a fifth transistor including: a gate electrode connected to an inverting control node; a first electrode configured to receive a high gate voltage; and a second electrode connected to a gate output node configured to output a gate signal; a sixth transistor including: a gate electrode connected to the second control node; a first electrode configured to receive the low gate voltage; and a second electrode connected to the gate output node; a seventh transistor including: a gate electrode configured to receive a global control signal; a first electrode configured to receive the high gate voltage; and a second electrode connected to the first control node; and an eighth transistor including: a gate electrode configured to receive an aging signal; a first electrode configured to receive an aging voltage; and a second electrode connected to the first electrode of the first transistor.

In an embodiment, each of the plurality of stages may further include: a first capacitor including a first electrode connected to the second control node, and a second electrode connected to the gate output node; and a second capacitor including a first electrode configured to receive the high gate voltage, and a second electrode connected to the inverting control node.

In an embodiment, each of the plurality of stages may further include a second transistor including: a gate electrode connected to the first control node; a first electrode configured to receive the high gate voltage; and a second electrode connected to the inverting control node.

In an embodiment, each of the plurality of stages may further include a fourth transistor including: a gate electrode connected to the second control node; a first electrode configured to receive the low gate voltage; and a second electrode connected to the inverting control node.

In an embodiment, the fourth transistor may be an N-type transistor, and the first transistor, the second transistor, the third transistor, the fifth transistor, the sixth transistor, and the seventh transistor may be P-type transistors.

In an embodiment, the aging voltage may be greater than a low voltage level of the clock signal and a low voltage level of the low gate voltage.

In an embodiment, in a first reset period, the global control signal may have a high voltage level, the clock signal may have a low voltage level, the low gate voltage may have a low voltage level, and the aging signal may have a low voltage level.

In an embodiment, in the first reset period, the eighth transistor may be configured to provide the aging voltage to the first electrode of the first transistor, the first transistor may be configured to provide a voltage of the first electrode of the first transistor to the first control node, and the third transistor may be configured to provide a voltage of the first control node to the second control node.

In an embodiment, in a first aging period after the first reset period, the global control signal may have the low voltage level, the clock signal may have the high voltage level, the low gate voltage may have the low voltage level, and the aging signal may have the low voltage level.

In an embodiment, in the first aging period, the seventh transistor may be configured to provide the high gate voltage to the first control node, and the eighth transistor may be configured to provide the aging voltage to the first electrode of the first transistor.

In an embodiment, in a second reset period after the first aging period, the global control signal may have the high voltage level, the clock signal may have the low voltage level, the low gate voltage may have the low voltage level, and the aging signal may have the low voltage level.

In an embodiment, in the second reset period, the eighth transistor may be configured to provide the aging voltage to the first electrode of the first transistor, the first transistor may be configured to provide a voltage of the first electrode of the first transistor to the first control node, and the third transistor may be configured to provide a voltage of the first control node to the second control node.

In an embodiment, in a second aging period after the second reset period, the global control signal may have the low voltage level, the clock signal may have the high voltage level, the low gate voltage may have the high voltage level, and the aging signal may have the low voltage level.

In an embodiment, in the second aging period, the seventh transistor may be configured to provide the high gate voltage to the first control node.

In an embodiment, in a first aging period after the first reset period, the global control signal may have the low voltage level, the clock signal may have the high voltage level, the low gate voltage may have the high voltage level, and the aging signal may have the low voltage level.

In an embodiment, in a second reset period after the first aging period, the global control signal may have the high voltage level, the clock signal may have the low voltage level, the low gate voltage may have the low voltage level, and the aging signal may have the low voltage level.

In an embodiment, in a second aging period after the second reset period, the global control signal may have the low voltage level, the clock signal may have the high voltage level, the low gate voltage may have the low voltage level, and the aging signal may have the low voltage level.

In an embodiment, an aging operation for the first transistor and the third transistor may be performed in a process operation or in a driving operation.

According to one or more embodiments of the present disclosure, a gate driver include a plurality of stages, each of the plurality of stages including: a first transistor including: a gate electrode configured to receive a clock signal; a first electrode configured to receive an input signal; and a second electrode connected to a first control node; a third transistor including: a gate electrode configured to receive a low gate voltage; a first electrode connected to the first control node; and a second electrode connected to a second control node; a fifth transistor including: a gate electrode connected to an inverting control node; a first electrode configured to receive a high gate voltage; and a second electrode connected to a gate output node configured to output a gate signal; a sixth transistor including: a gate electrode connected to the second control node; a first electrode configured to receive the low gate voltage; and a second electrode connected to the gate output node; a seventh transistor including: a gate electrode configured to receive a global control signal; a first electrode configured to receive the high gate voltage; and a second electrode connected to the first control node; and an eighth transistor including: a gate electrode configured to receive an aging signal; a first electrode configured to receive the low gate voltage; and a second electrode connected to the first electrode of the first transistor.

In an embodiment, in a reset period, the global control signal may have a high voltage level, the clock signal may have a low voltage level, the low gate voltage may have a low voltage level, and the aging signal may have a low voltage level.

In an embodiment, in the reset period, the eighth transistor may be configured to provide the low voltage level of the low gate voltage to the first electrode of the first transistor, the first transistor may be configured to provide a voltage of the first electrode of the first transistor to the first control node, and the third transistor may be configured to provide a voltage of the first control node to the second control node.

In an embodiment, in an aging period after the reset period, the global control signal may have the low voltage level, the clock signal may have the high voltage level, the low gate voltage may have the high voltage level, and the aging signal may have the low voltage level.

In an embodiment, in the aging period, the seventh transistor may be configured to provide the high gate voltage to the first control node, and the eighth transistor may be configured to provide the high voltage level of the low gate voltage to the first electrode of the first transistor.

In an embodiment, an aging operation for the first transistor and the third transistor may be performed in a process operation or a driving operation.

According to one or more embodiments of the present disclosure, a display device includes: a display panel including a plurality of pixels; and a gate driver including a plurality of stages configured to provide gate signals to the pixels, each of the plurality of stages including: a first transistor including a gate electrode configured to receive a clock signal, a first electrode configured to receive an input signal, and a second electrode connected to a first control node; a third transistor including a gate electrode configured to receive a low gate voltage, a first electrode connected to the first control node, and a second electrode connected to a second control node; a fifth transistor including a gate electrode connected to an inverting control node, a first electrode configured to receive a high gate voltage, and a second electrode connected to a gate output node configured to output a gate signal from among the gate signals; a sixth transistor including a gate electrode connected to the second control node, a first electrode configured to receive the low gate voltage, and a second electrode connected to the gate output node; a seventh transistor including a gate electrode configured to receive a global control signal, a first electrode configured to receive the high gate voltage, and a second electrode connected to the first control node; and an eighth transistor including a gate electrode configured to receive an aging signal, a first electrode configured to receive an aging voltage, and a second electrode connected to the first electrode of the first transistor.

According to some embodiments of the present disclosure, in the gate driver and the display device including the gate driver, the aging operation may be performed on the first transistor and the third transistor to prevent or substantially prevent a leakage current. Accordingly, a reliability of the gate driver may be improved.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
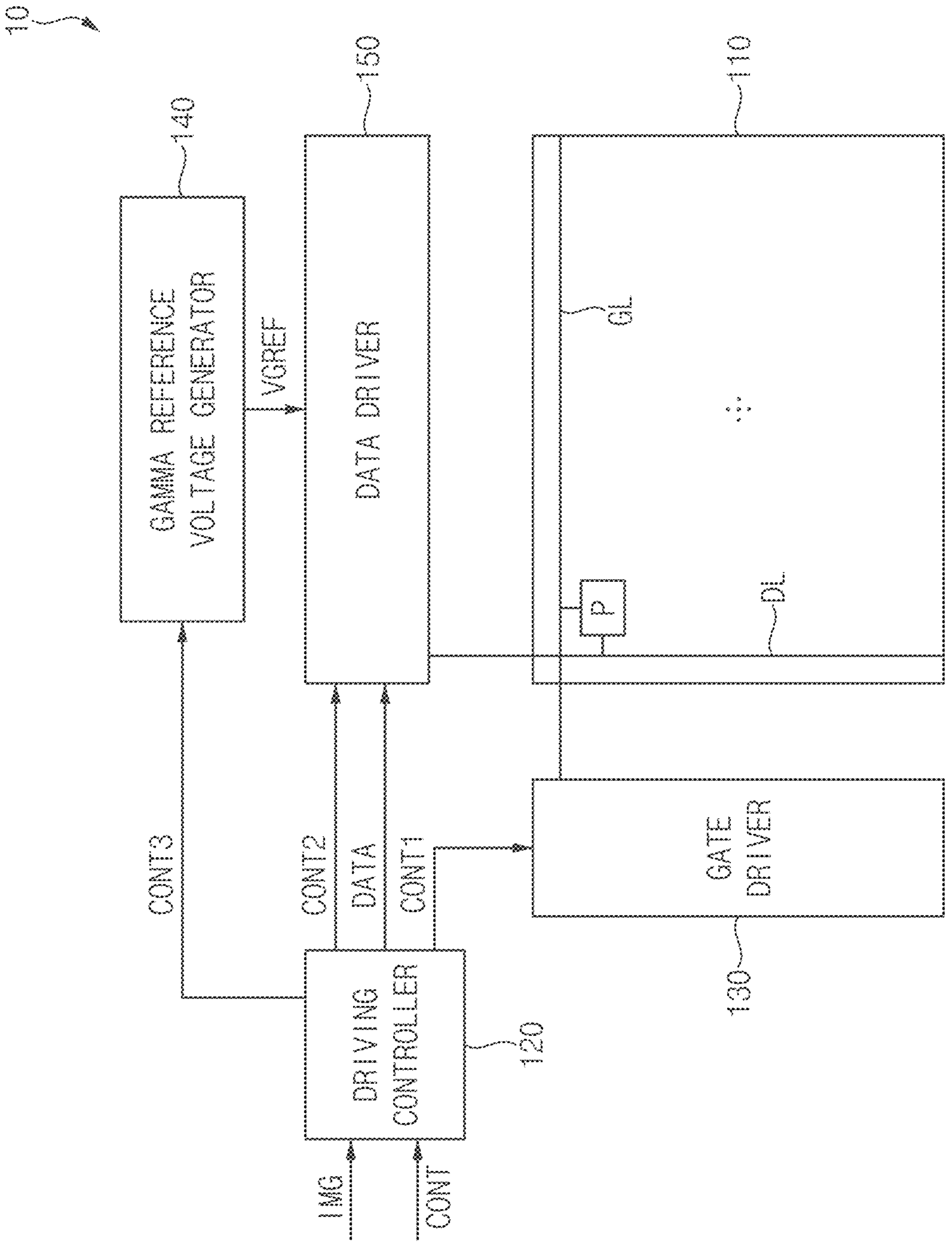
FIG. 1 is a block diagram illustrating a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device 10 according to one or more embodiments of the present disclosure.

Referring to FIG. 1, the display device 10 may include a display panel 110 and a display panel driver. The display panel driver may include a driving controller 120, a gate driver 130, a gamma reference voltage generator 140, and a data driver 150.

The display panel 110 may include a display area for displaying an image, and a peripheral area adjacent to the display area.

The display panel 110 may include gate lines GL, data lines DL, and pixels P electrically connected to the gate lines GL and the data lines DL. The gate lines GL may extend in a first direction, and the data lines DL may extend in a second direction crossing the first direction.

The driving controller 120 may receive input image data IMG and an input control signal CONT from an external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, and a data signal DATA based on the input image data IMG and the input control signal CONT.

The driving controller 120 may generate the first control signal CONT1 for controlling an operation of the gate driver 130 based on the input control signal CONT, and may output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and may output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and may output the third control signal CONT3 to the gamma reference voltage generator 140.

The gate driver 130 may generate gate signals for driving the gate lines GL in response to the first control signal CONT1 received from the driving controller 120. The gate driver 130 may output the gate signals to the gate lines GL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

In an embodiment, the gamma reference voltage generator 140 may be disposed in the driving controller 120, or may be disposed in the data driver 150.

The data driver 150 may receive the second control signal CONT2 and the data signal DATA from the driving controller 120, and may receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

Figure 2:
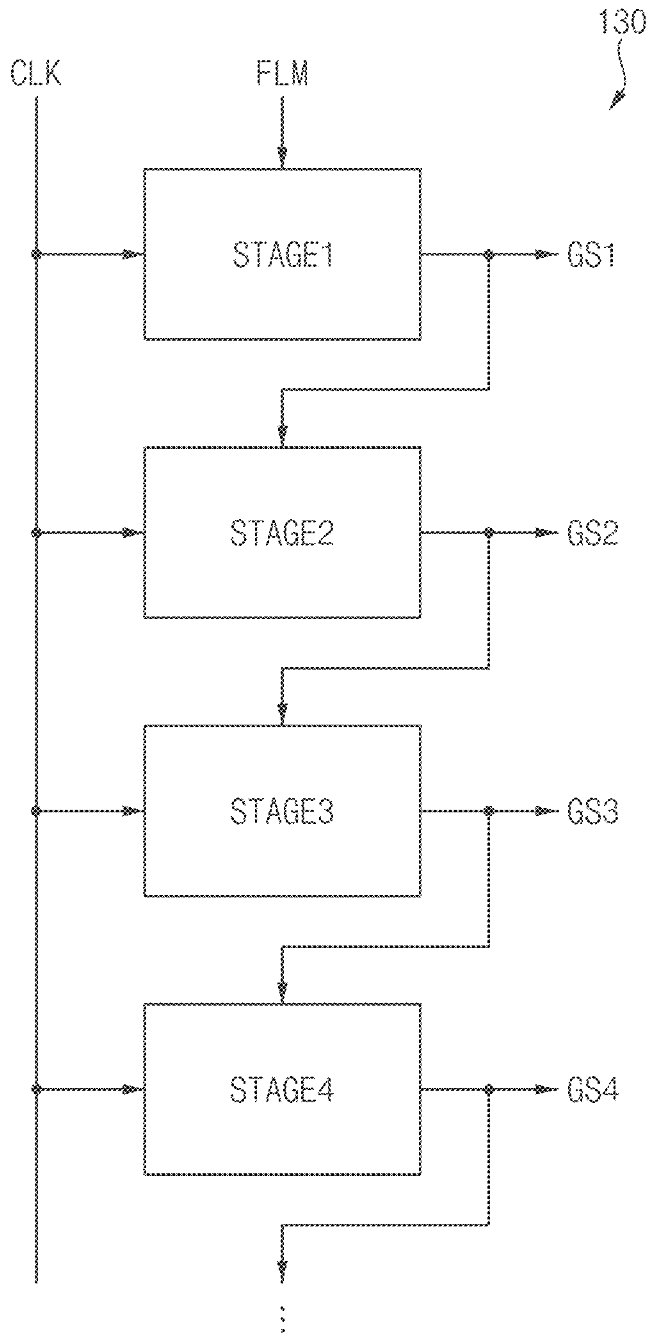
FIG. 2 is a block diagram illustrating a gate driver included in the display device of FIG. 1.

FIG. 2 is a block diagram illustrating the gate driver 130 included in the display device 10 of FIG. 1.

Referring to FIGS. 1 and 2, the gate driver 130 may include a plurality of stages STAGE1, STAGE2, STAGE3, STAGE4, . . . , and the like, which receive a gate start signal FLM and a clock signal CLK, and may output gate signals GS1, GS2, GS3, GS4, . . . , and the like. A first stage STAGE1 may receive the gate start signal FLM as an input signal. Each of subsequent stages STAGE2, STAGE3, STAGE4, . . . , and the like may receive the gate signals GS1, GS2, GS3, GS4, . . . , and the like of at least one corresponding previous stages as the input signal.

For example, as shown in FIG. 2, the stages STAGE1, STAGE2, STAGE3, STAGE4, . . . , and the like may sequentially output the gate signals GS1, GS2, GS3, GS4, . . . , and the like within one frame period. The first stage STAGE1 may output a first gate signal GS1 based on the gate start signal FLM. A second stage STAGE2 may output a second gate signal GS2 based on the first gate signal GS1. A third stage STAGE3 may output a third gate signal GS3 based on the second gate signal GS2. A fourth stage STAGE4 may output a fourth gate signal GS4 based on the third gate signal GS3.

Figure 3:
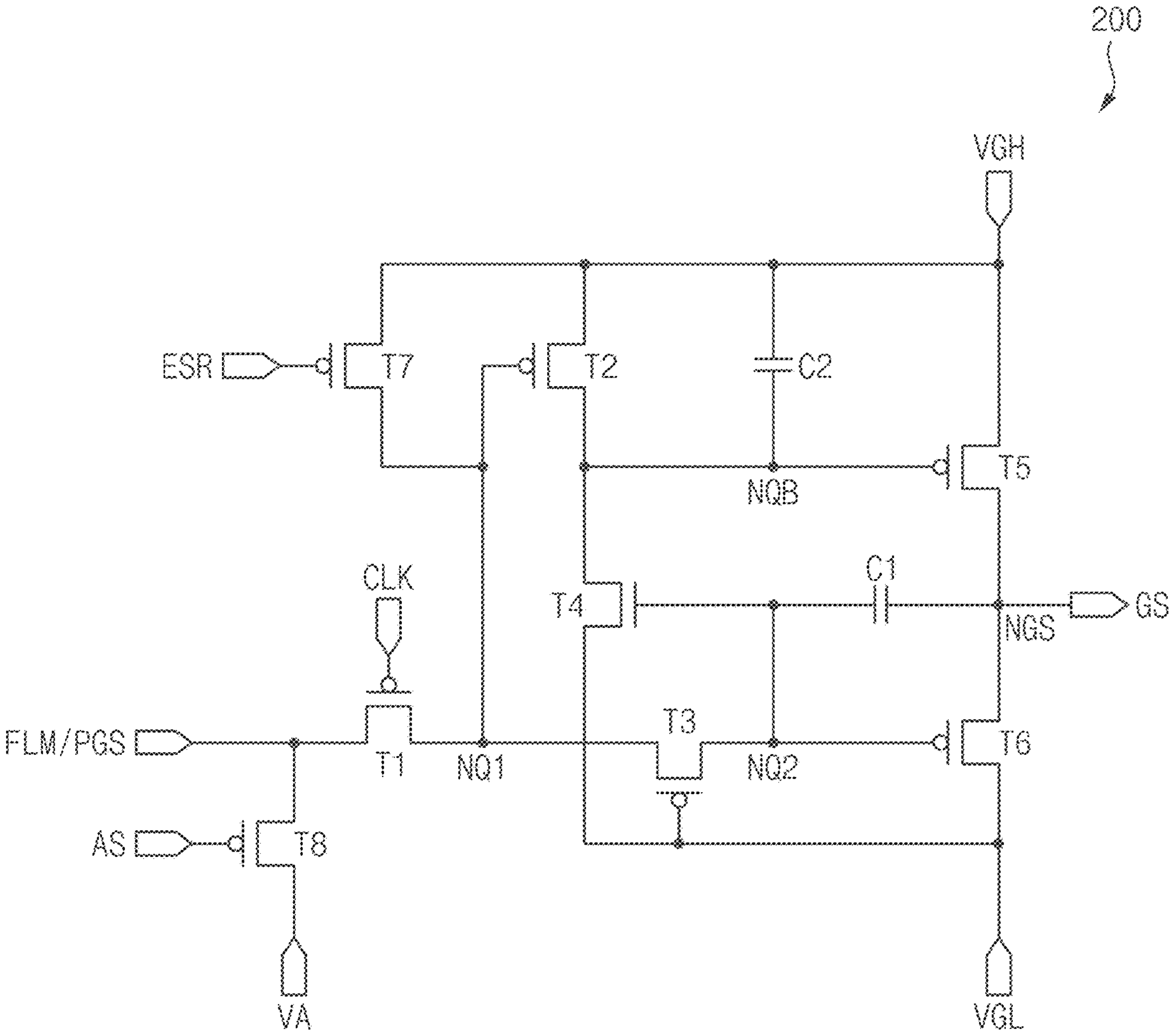
FIG. 3 is a circuit diagram illustrating an example of a stage included in the gate driver of FIG. 2.

FIG. 3 is a circuit diagram illustrating an example of the stage 200 included in the gate driver 130 of FIG. 2.

Referring to FIGS. 1 to 3, the gate driver 130 may include a plurality of stages 200. Each stage 200 may include a first transistor T1, a third transistor T3, a fifth transistor T5, a sixth transistor T6, a seventh transistor T7, and an eighth transistor T8.

The first transistor T1 may include a gate electrode for receiving a clock signal CLK, a first electrode for receiving an input signal FLM/PGS, and a second electrode connected to a first control node NQ1. The input signal FLM/PGS may be a gate start signal FLM or a previous gate signal PGS. The gate start signal FLM may be a signal that starts an operation of a first stage STAGE1 from among the stages 200. The previous gate signal PGS may be a gate signal output from any one of the previous stages. The first transistor T1 may provide the input signal FLM/PGS to the first control node NQ1 in response to the clock signal CLK.

The third transistor T3 may include a gate electrode for receiving a low gate voltage VGL, a first electrode connected to the first control node NQ1, and a second electrode connected to a second control node NQ2. The third transistor T3 may provide a voltage of the first control node NQ1 to the second control node NQ2.

The fifth transistor T5 may include a gate electrode connected to an inverting control node NQB, a first electrode for receiving a high gate voltage VGH, and a gate output node NGS where a gate signal GS is output. The fifth transistor T5 may provide the high gate voltage VGH to the gate output node NGS in response to a voltage of the inverting control node NQB.

The sixth transistor T6 may include a gate electrode connected to the second control node NQ2, a first electrode for receiving the low gate voltage VGL, and a second electrode connected to the gate output node NGS. The sixth transistor T6 may provide the low gate voltage VGL to the gate output node NGS in response to a voltage of the second control node NQ2.

The seventh transistor T7 may include a gate electrode for receiving a global control signal ESR, a first electrode for receiving the high gate voltage VGH, and a second electrode connected to the first control node NQ1. The seventh transistor T7 may provide the high gate voltage VGH to the first control node NQ1 in response to the global control signal ESR.

The eighth transistor T8 may include a gate electrode for receiving an aging signal AS, a first electrode for receiving an aging voltage VA, and a second electrode connected to the first electrode of the first transistor T1. The eighth transistor T8 may provide the aging voltage VA to the first electrode of the first transistor T1 in response to the aging signal AS.

In an embodiment, each stage 200 may further include a first capacitor C1 and a second capacitor C2.

The first capacitor C1 may include a first electrode connected to the second control node NQ2, and a second electrode connected to the gate output node NGS. The first capacitor C1 may stabilize the voltage of the second control node NQ2.

The second capacitor C2 may include a first electrode for receiving the high gate voltage VGH, and a second electrode connected to the inverting control node NQB. The second capacitor C2 may reduce a distortion of a waveform of the gate signal GS.

In an embodiment, each stage 200 may further include a second transistor T2.

The second transistor T2 may include a gate electrode connected to the first control node NQ1, a first electrode for receiving the high gate voltage VGH, and a second electrode connected to the inverting control node NQB. The second transistor T2 may provide the high gate voltage VGH to the inverting control node NQB in response to the voltage of the first control node NQ1.

In an embodiment, each stage 200 may further include a fourth transistor T4.

The fourth transistor T4 may include a gate electrode connected to the second control node NQ2, a first electrode for receiving the low gate voltage VGL, and a second electrode connected to the inverting control node NQB. The fourth transistor T4 may provide the low gate voltage VGL to the inverting control node NQB in response to the voltage of the second control node NQ2.

In an embodiment, the fourth transistor T4 may be an N-type transistor, and the first transistor T1, the second transistor T2, the third transistor T3, the fifth transistor T5, the sixth transistor T6, and the seventh transistor T7 may be P-type transistors. For example, the first transistor T1, the second transistor T2, the third transistor T3, the fifth transistor T5, the sixth transistor T6, and the seventh transistor T7 may be PMOS transistors, and the fourth transistor T4 may be an NMOS transistor.

In order for the sixth transistor T6 including the first electrode for receiving the low gate voltage VGL to provide the low gate voltage VGL to the gate output node NGS in response to the voltage of the second control node NQ2, the voltage of the second control node NQ2 may be at least less than $VGL-|VTH|$, where VGL is the low gate voltage and $|VTH|$ is an absolute value of a threshold voltage of the sixth transistor T6. However, a leakage path may be formed through the first transistor T1 and the third transistor T3, a leakage current may flow through the leakage path, and the voltage of the second control node NQ2 may increase. When the voltage of the second control node NQ2 increases, the waveform of the gate signal GS may be distorted. In each stage 200, an aging operation may be performed on the first transistor T1 and the third transistor T3 to prevent or substantially prevent the leakage current. The aging operation refers to an operation of applying a stress in advance to a turned-off transistor. When the aging operation is performed on the transistor, a change in a characteristics of the transistor may be prevented or substantially prevented even if the transistor is used, and the leakage current may be prevented or substantially prevented. The aging operation will be described in more detail below.

Figure 4:
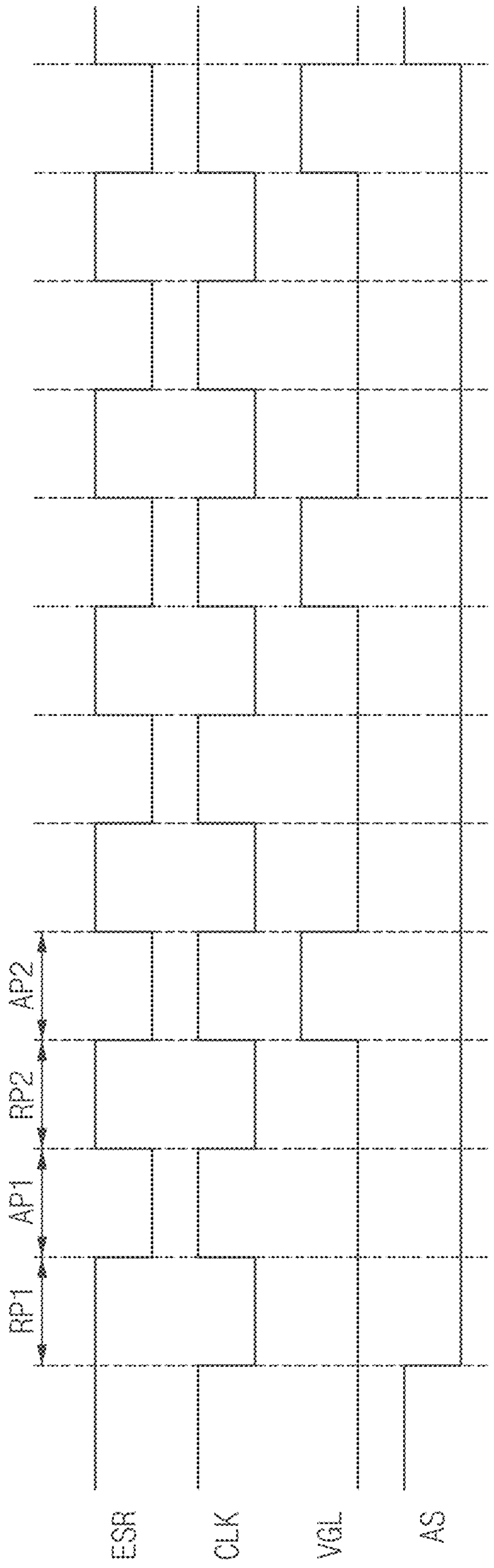
FIG. 4 is a timing diagram illustrating an example of an aging operation of the stage of FIG. 3.

FIG. 4 is a timing diagram illustrating an example of the aging operation of the stage 200 of FIG. 3.

Referring to FIGS. 1 to 4, the aging operation may be performed when the aging signal AS has a low voltage level.

In a first reset period RP1, the global control signal ESR may have a high voltage level, the clock signal CLK may have the low voltage level, the low gate voltage VGL may have the low voltage level, and the aging signal AS may have the low voltage level.

In a first aging period AP1 after the first reset period RP1, the global control signal ESR may have the low voltage level, the clock signal CLK may have the high voltage level, the low gate voltage VGL may have the low voltage level, and the aging signal AS may have the low voltage level.

In a second reset period RP2 after the first aging period AP1, the global control signal ESR may have the high voltage level, the clock signal CLK may have the low voltage level, the low gate voltage VGL may have the low voltage level, and the aging signal AS may have the low voltage level.

In a second aging period AP2 after the second reset period RP2, the global control signal ESR may have the low voltage level, the clock signal CLK may have the high voltage level, the low gate voltage VGL may have the high voltage level, and the aging signal AS may have the low voltage level.

Figure 5:
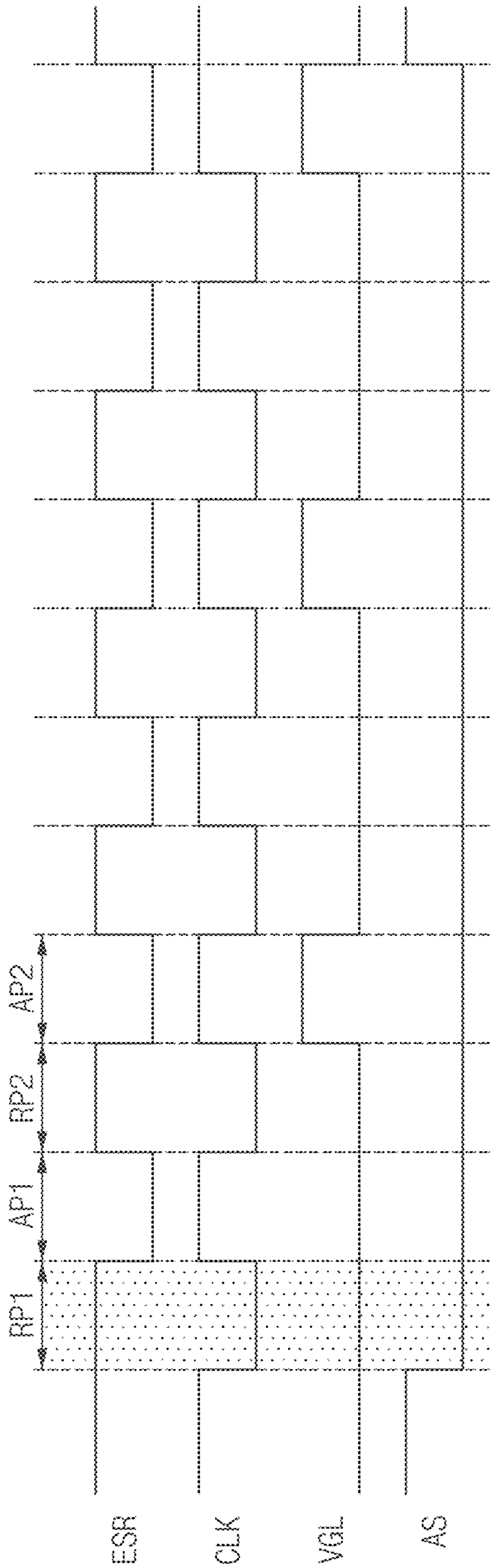
FIG. 5 is a timing diagram illustrating an example of the stage of FIG. 3 operating in a first reset period of FIG. 4.
Figure 6:
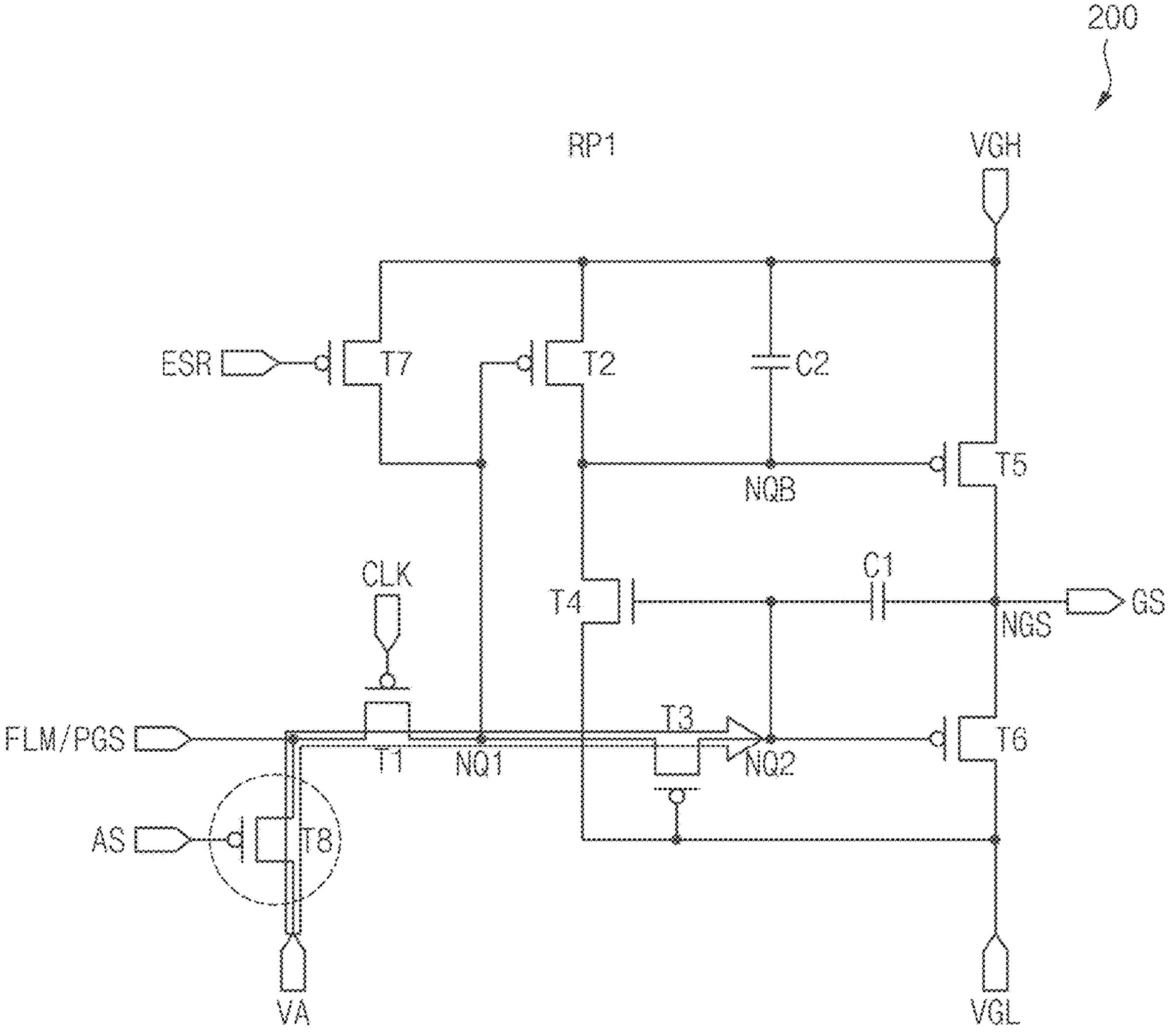
FIG. 6 is a circuit diagram illustrating an example of the stage of FIG. 3 operating in the first reset period of FIG. 4.

FIG. 5 is a timing diagram illustrating an example of the stage 200 of FIG. 3 operating in the first reset period RP1 of FIG. 4. FIG. 6 is a circuit diagram illustrating an example of the stage 200 of FIG. 3 operating in the first reset period RP1 of FIG. 4.

Referring to FIGS. 1 to 6, in the first reset period RP1, the global control signal ESR may have the high voltage level, the clock signal CLK may have the low voltage level, the low gate voltage VGL may have the low voltage level, and the aging signal AS may have the low voltage level.

The eighth transistor T8 may be turned on in response to the aging signal AS having the low voltage level. The eighth transistor T8 may provide the aging voltage VA to the first electrode of the first transistor T1, and the first electrode of the first transistor T1 may have the aging voltage VA.

The first transistor T1 may be turned on in response to the clock signal CLK having the low voltage level. The first transistor T1 may provide a voltage of the first electrode of the first transistor T1 to the first control node NQ1, and the first control node NQ1 may provide the aging voltage VA.

The third transistor T3 may be turned on in response to the low gate voltage VGL having the low voltage level. The third transistor T3 may provide the voltage of the first control node NQ1 to the second control node NQ2, and the second control node NQ2 may have the aging voltage VA.

As such, in the first reset period RP1, the first electrode of the first transistor T1, the first control node NQ1, and the second control node NQ2 may be reset to the aging voltage VA.

In an embodiment, the aging voltage VA may be greater than the low voltage level of the clock signal CLK and the low voltage level of the low gate voltage VGL. Accordingly, a drop in a threshold voltage of the first transistor T1 and the third transistor T3 may be prevented or substantially prevented.

Figure 7:
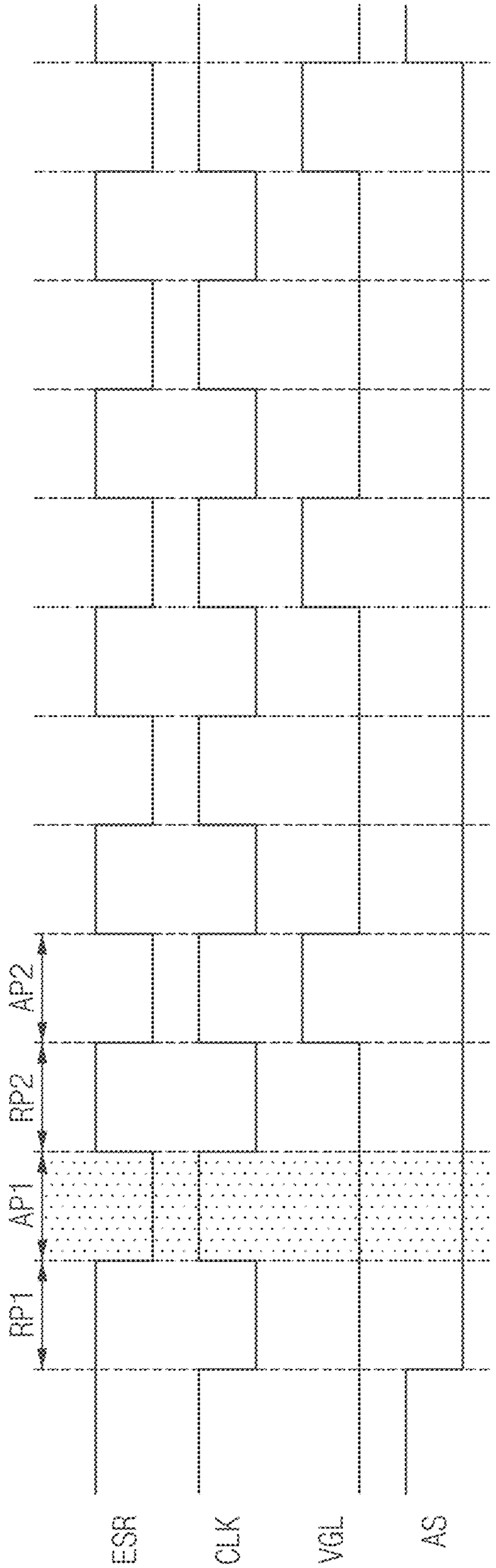
FIG. 7 is a timing diagram illustrating an example of the stage of FIG. 3 operating in a first aging period of FIG. 4.
Figure 8:
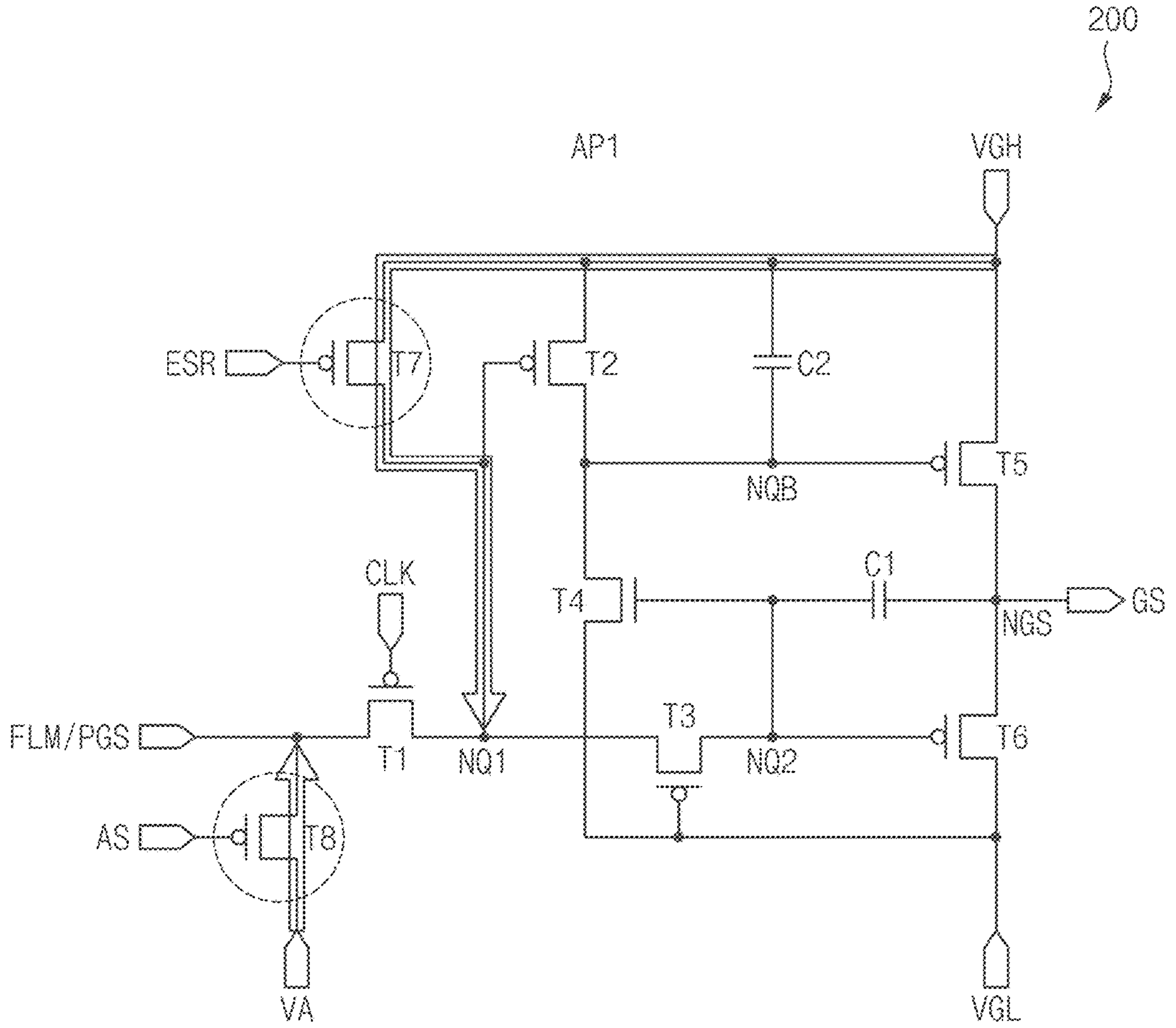
FIG. 8 is a circuit diagram illustrating an example of the stage of FIG. 3 operating in the first aging period of FIG. 4.

FIG. 7 is a timing diagram illustrating an example of the stage 200 of FIG. 3 operating in the first aging period AP1 of FIG. 4. FIG. 8 is a circuit diagram illustrating an example of the stage 200 of FIG. 3 operating in the first aging period AP1 of FIG. 4.

Referring to FIGS. 1 to 8, in the first aging period AP1, the global control signal ESR may have the low voltage level, the clock signal CLK may have the high voltage level, the low gate voltage VGL may have the low voltage level, and the aging signal AS may have the low voltage level.

The first transistor T1 may be turned off in response to the clock signal CLK having the high voltage level.

The eighth transistor T8 may be turned on in response to the aging signal AS having the low voltage level. The eighth transistor T8 may provide the aging voltage VA to the first electrode of the first transistor T1, and the first electrode of the first transistor T1 may have the aging voltage VA.

The seventh transistor T7 may be turned on in response to the global control signal ESR having the low voltage level. The seventh transistor T7 may provide the high gate voltage VGH to the first control node NQ1, and the first control node NQ1 may have the high gate voltage VGH.

As such, the first transistor T1 may be turned off, a gate-source voltage of the first transistor T1 may have a positive value, and a drain-source voltage of the first transistor T1 may have the positive value, such that the aging operation may be performed on the first transistor T1.

Figure 9:
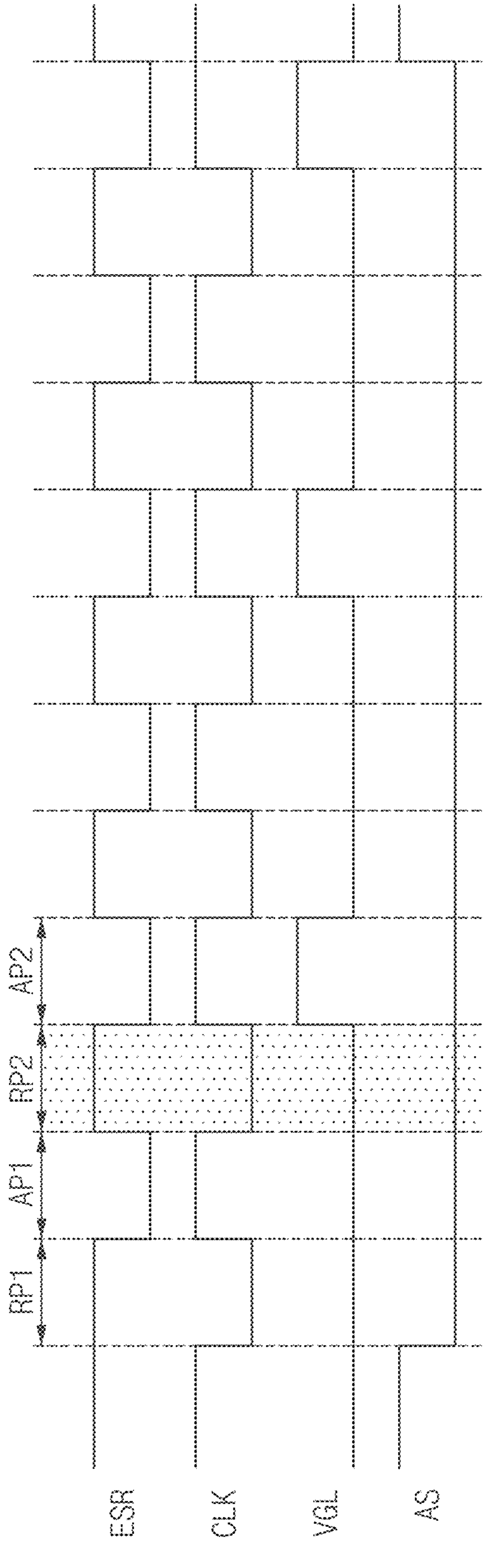
FIG. 9 is a timing diagram illustrating an example of the stage of FIG. 3 operating in a second reset period of FIG. 4.
Figure 10:
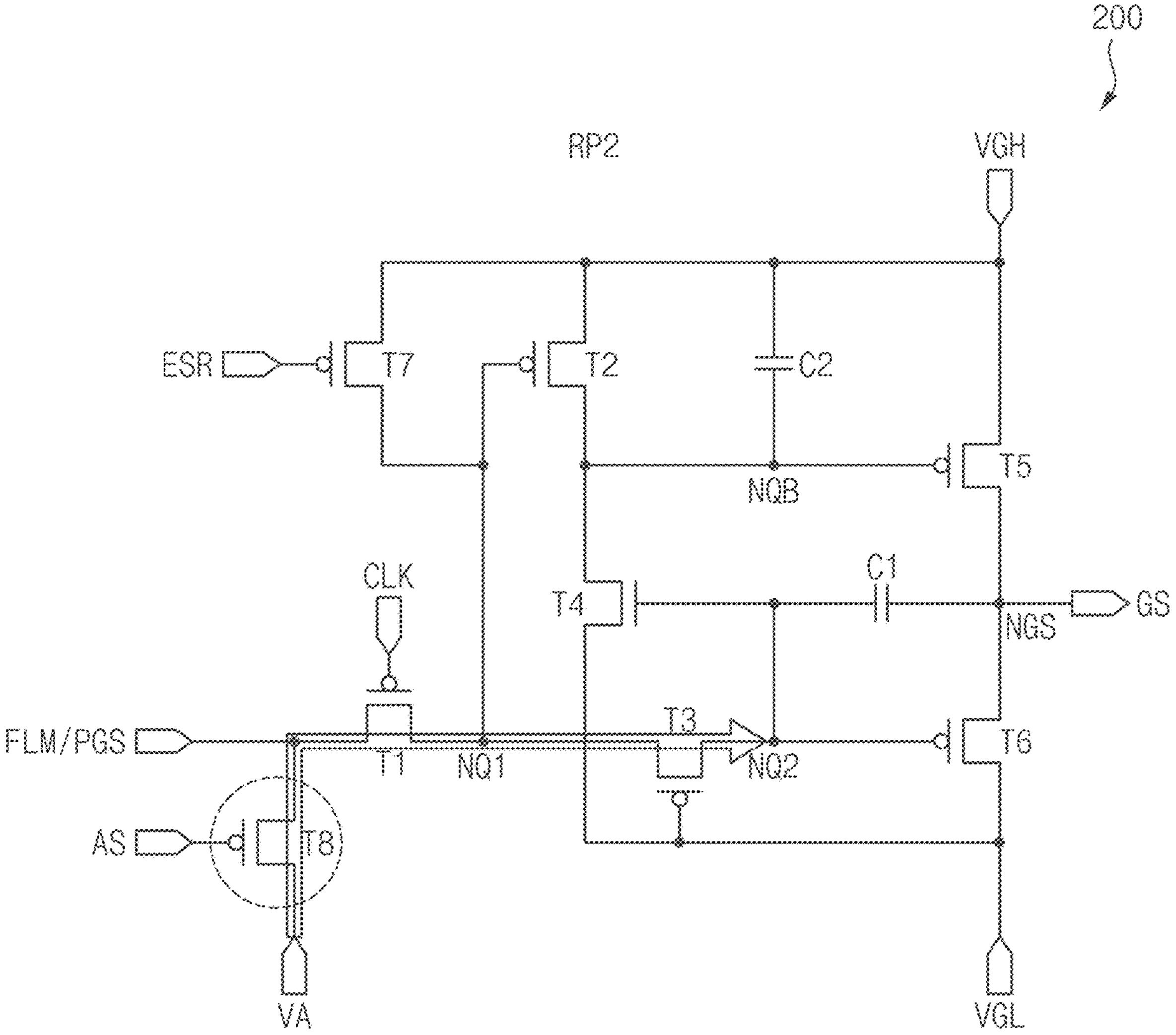
FIG. 10 is a circuit diagram illustrating an example of the stage of FIG. 3 operating in the second reset period of FIG. 4.

FIG. 9 is a timing diagram illustrating an example of the stage 200 of FIG. 3 operating in the second reset period RP2 of FIG. 4. FIG. 10 is a circuit diagram illustrating an example of the stage 200 of FIG. 3 operating in the second reset period RP2 of FIG. 4.

An operation of the stage 200 in the second reset period RP2 may be the same or substantially the same as the operation of the stage 200 in the first reset period RP1.

Referring to FIGS. 1 to 10, in the second reset period RP2, the global control signal ESR may have the high voltage level, the clock signal CLK may have the low voltage level, the low gate voltage VGL may have the low voltage level, and the aging signal AS may have the low voltage level.

The eighth transistor T8 may be turned on in response to the aging signal AS having the low voltage level. The eighth transistor T8 may provide the aging voltage VA to the first electrode of the first transistor T1, and the first electrode of the first transistor T1 may have the aging voltage VA.

The first transistor T1 may be turned on in response to the clock signal CLK having the low voltage level. The first transistor T1 may provide a voltage of the first electrode of the first transistor T1 to the first control node NQ1, and the first control node NQ1 may have the aging voltage VA.

The third transistor T3 may be turned on in response to the low gate voltage VGL having the low voltage level. The third transistor T3 may provide the voltage of the first control node NQ1 to the second control node NQ2, and the second control node NQ2 may have the aging voltage VA.

As such, in the second reset period RP2, the first electrode of the first transistor T1, the first control node NQ1, and the second control node NQ2 may be reset to the aging voltage VA.

Figure 11:
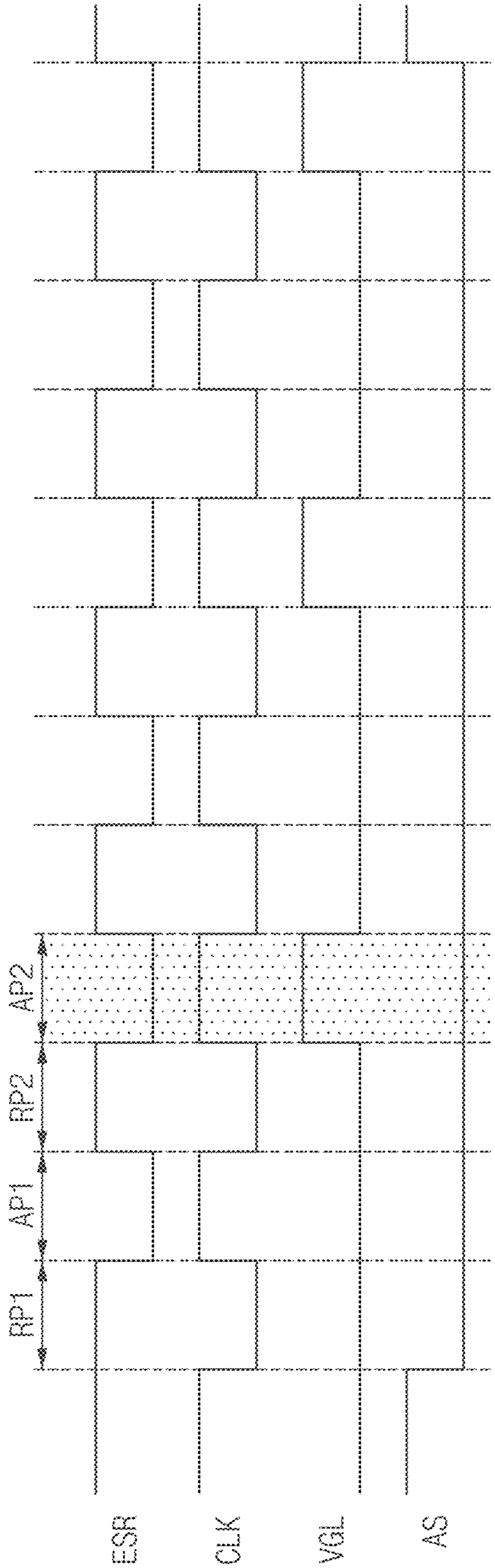
FIG. 11 is a timing diagram illustrating an example of the stage of FIG. 3 operating in a second aging period of FIG. 4.
Figure 12:
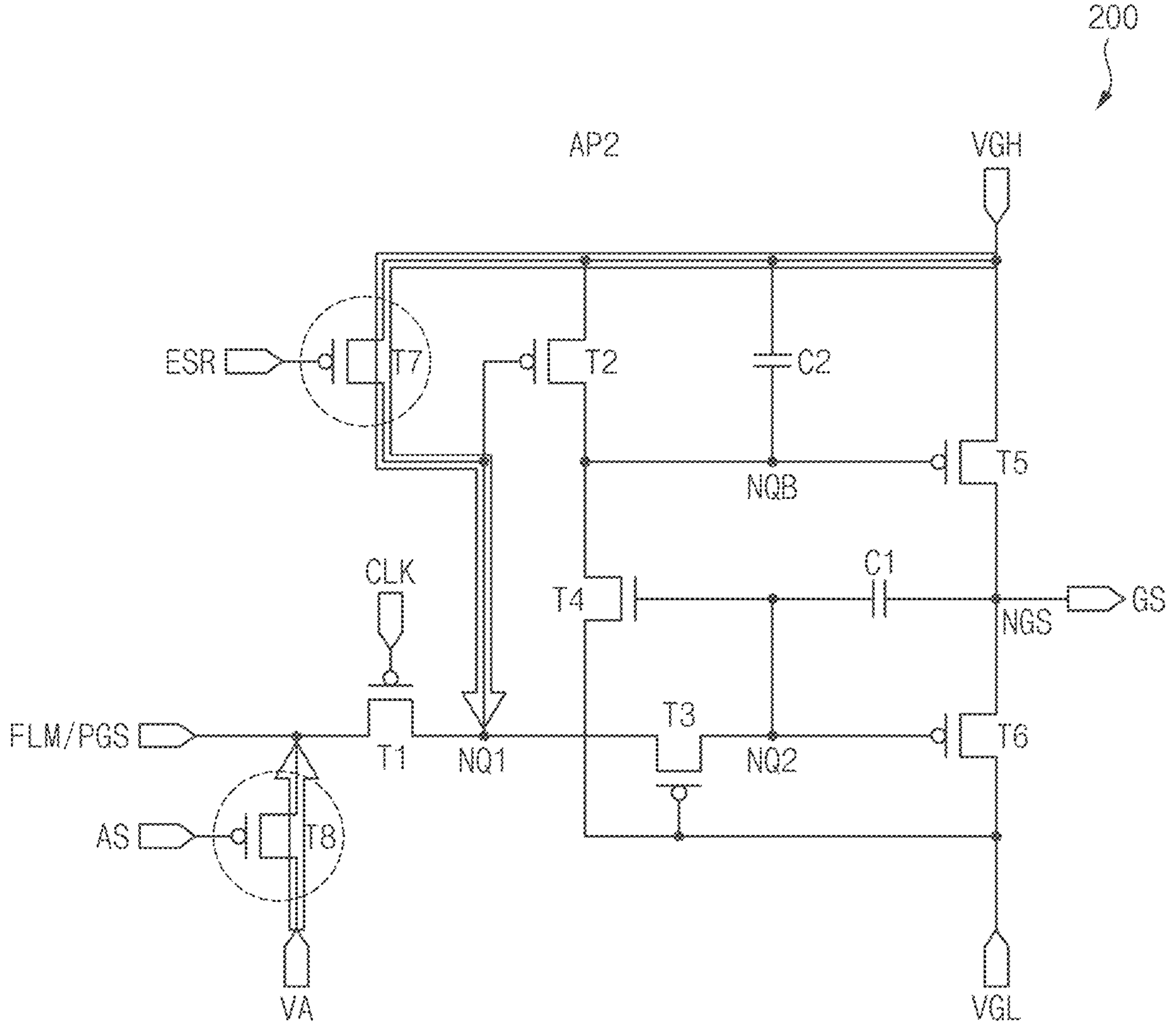
FIG. 12 is a circuit diagram illustrating an example of the stage of FIG. 3 operating in the second aging period of FIG. 4.

FIG. 11 is a timing diagram illustrating an example of the stage 200 of FIG. 3 operating in the second aging period AP2 of FIG. 4. FIG. 12 is a circuit diagram illustrating an example of the stage 200 of FIG. 3 operating in the second aging period AP2 of FIG. 4.

Referring to FIGS. 1 to 12, in the second aging period AP2, the global control signal ESR may have the low voltage level, the clock signal CLK may have the high voltage level, the low gate voltage VGL may have the high voltage level, and the aging signal AS may have the low voltage level.

The third transistor T3 may be turned off in response to the low gate voltage VGL having the high voltage level.

The seventh transistor T7 may be turned on in response to the global control signal ESR having the low voltage level. The seventh transistor T7 may provide the high gate voltage VGH to the first control node NQ1, and the first control node NQ1 may have the high gate voltage VGH.

As such, the third transistor T3 may be turned off, a gate-source voltage of the third transistor T3 may have a positive value, and a drain-source voltage of the third transistor T3 may have a positive value, such that the aging operation may be performed on the third transistor T3.

The aging operation may be performed on the first transistor T1 and the third transistor T3, such that the leakage current may be prevented or substantially prevented, and a reliability of the gate driver 130 may be improved.

The aging operation for the first transistor T1 and the third transistor T3 may be performed in a process. However, as the display device 10 is driven, the leakage current may increase again. Therefore, the aging operation for the first transistor T1 and the third transistor T3 may be performed even during a driving process of the display device 10.

Figure 13:
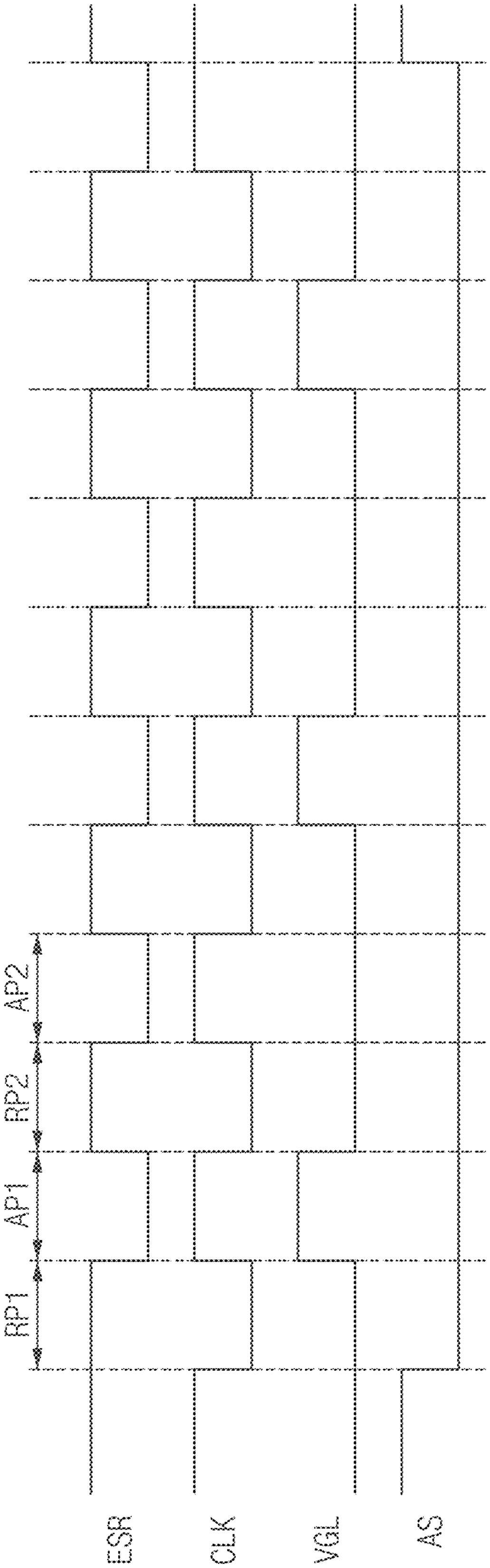
FIG. 13 is a timing diagram illustrating an example of the aging operation of the stage of FIG. 3.

FIG. 13 is a timing diagram illustrating an example of the aging operation of the stage 200 of FIG. 3.

Referring to FIGS. 1 to 13, as described above with reference to FIGS. 4 to 12, after the aging operation is performed on the first transistor T1, the aging operation may be performed on the third transistor T3. As another example, as shown in FIG. 13, the aging operation may be performed on the first transistor T1 after the aging operation is performed on the third transistor T3.

As shown in FIG. 13, in a first reset period RP1, the global control signal ESR may have a high voltage level, the clock signal CLK may have a low voltage level, the low gate voltage VGL may have a low voltage level, and the aging signal AS may have the low voltage level.

In an embodiment, in a first aging period AP1 after the first reset period FP1, the global control signal ESR may have the low voltage level, the clock signal CLK may have the high voltage level, the low gate voltage VGL may have the high voltage level, and the aging signal AS may have the low voltage level.

In an embodiment, in a second reset period RP2 after the first aging period AP1, the global control signal ESR may have the high voltage level, the clock signal CLK may have the low voltage level, the low gate voltage VGL may have the low voltage level, and the aging signal AS may have the low voltage level.

In an embodiment, in a second aging period AP2 after the second reset period RP2, the global control signal ESR may have the low voltage level, the clock signal CLK may have the high voltage level, the low gate voltage VGL may have the low voltage level, and the aging signal AS may have the low voltage level.

Accordingly, the aging operation may be performed on the third transistor T3 in the first aging period AP1, and the aging operation may be performed on the first transistor T1 in the second aging period AP2.

Figure 14:
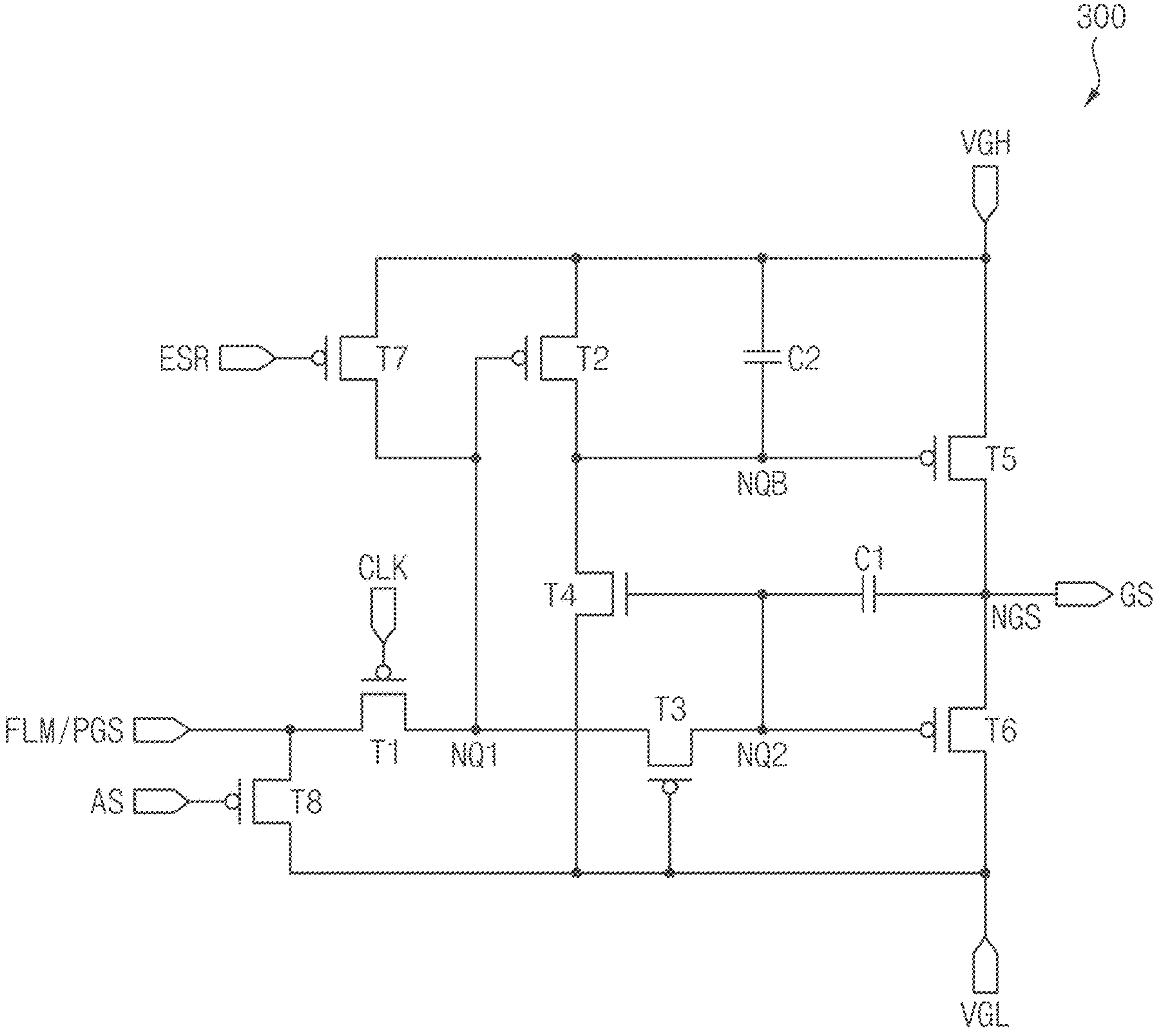
FIG. 14 is a circuit diagram illustrating an example of the stage included in the gate driver of FIG. 2.

FIG. 14 is a circuit diagram illustrating an example of the stage 300 included in the gate driver 130 of FIG. 2.

Referring to FIGS. 1, 2, and 14, a gate driver 130 may include a plurality of stages 300. Each stage 300 may include a first transistor T1, a third transistor T3, a fifth transistor T5, a sixth transistor T6, a seventh transistor T7, and an eighth transistor T8.

The first transistor T1 may include a gate electrode for receiving a clock signal CLK, a first electrode for receiving an input signal FLM/PGS, and a second electrode connected to a first control node NQ1. The input signal FLM/PGS may be a gate start signal FLM or a previous gate signal PGS. The gate start signal FLM may be a signal that starts an operation of a first stage STAGE1 from among the stages 200. The previous gate signal PGS may be a gate signal output from any one of the previous stages. The first transistor T1 may provide the input signal FLM/PGS to the first control node NQ1 in response to the clock signal CLK.

The third transistor T3 may include a gate electrode for receiving a low gate voltage VGL, a first electrode connected to the first control node NQ1, and a second electrode connected to a second control node NQ2. The third transistor T3 may provide a voltage of the first control node NQ1 to the second control node NQ2.

The fifth transistor T5 may include to a gate electrode connected to an inverting control node NQB, a first electrode for receiving a high gate voltage VGH, and a second electrode connected to a gate output node NGS where a gate signal GS is output. The fifth transistor T5 may provide the high gate voltage VGH to the gate output node NGS in response to a voltage of the inverting control node NQB.

The sixth transistor T6 may include a gate electrode connected to the second control node NQ2, a first electrode for receiving the low gate voltage VGL, and a second electrode connected to the gate output node NGS. The sixth transistor T6 may provide the low gate voltage VGL to the gate output node NGS in response to a voltage of the second control node NQ2.

The seventh transistor T7 may include a gate electrode for receiving a global control signal ESR, a first electrode for receiving the high gate voltage VGH, and a second electrode connected to the first control node NQ1. The seventh transistor T7 may provide the high gate voltage VGH to the first control node NQ1 in response to the global control signal ESR.

The eighth transistor T8 may have a gate electrode for receiving an aging signal AS, a first electrode for receiving the low gate voltage VGL, and a second electrode connected to the first electrode of the first transistor T1. The eighth transistor T8 may provide the low gate voltage VGL to the first electrode of the first transistor T1 in response to the aging signal AS.

In an embodiment, each stage 200 may further include a first capacitor C1 and a second capacitor C2.

The first capacitor C1 may include a first electrode connected to the second control node NQ2, and a second electrode connected to the gate output node NGS. The first capacitor C1 may stabilize the voltage of the second control node NQ2.

The second capacitor C2 may include a first electrode for receiving the high gate voltage VGH, and a second electrode connected to the inverting control node NQB. The second capacitor C2 may reduce a distortion of a waveform of the gate signal GS.

In an embodiment, each stage 200 may further include a second transistor T2.

The second transistor T2 may include a gate electrode connected to the first control node NQ1, a first electrode for receiving the high gate voltage VGH, and a second electrode connected to the inverting control node NQB. The second transistor T2 may provide the high gate voltage VGH to the inverting control node NQB in response to the voltage of the first control node NQ1.

In an embodiment, each stage 200 may further include a fourth transistor T4.

The fourth transistor T4 may include a gate electrode connected to the second control node NQ2, a first electrode for receiving the low gate voltage VGL, and a second electrode connected to the inverting control node NQB. The fourth transistor T4 may provide the low gate voltage VGL to the inverting control node NQB in response to the voltage of the second control node NQ2.

In an embodiment, the fourth transistor T4 may be an N-type transistor, and the first transistor T1, the second transistor T2, the third transistor T3, the fifth transistor T5, the sixth transistor T6, and the seventh transistor T7 may be P-type transistors. For example, the first transistor T1, the second transistor T2, the third transistor T3, the fifth transistor T5, the sixth transistor T6, and the seventh transistor T7 may be PMOS transistors, and the fourth transistor T4 may be an NMOS transistor.

Figure 15:
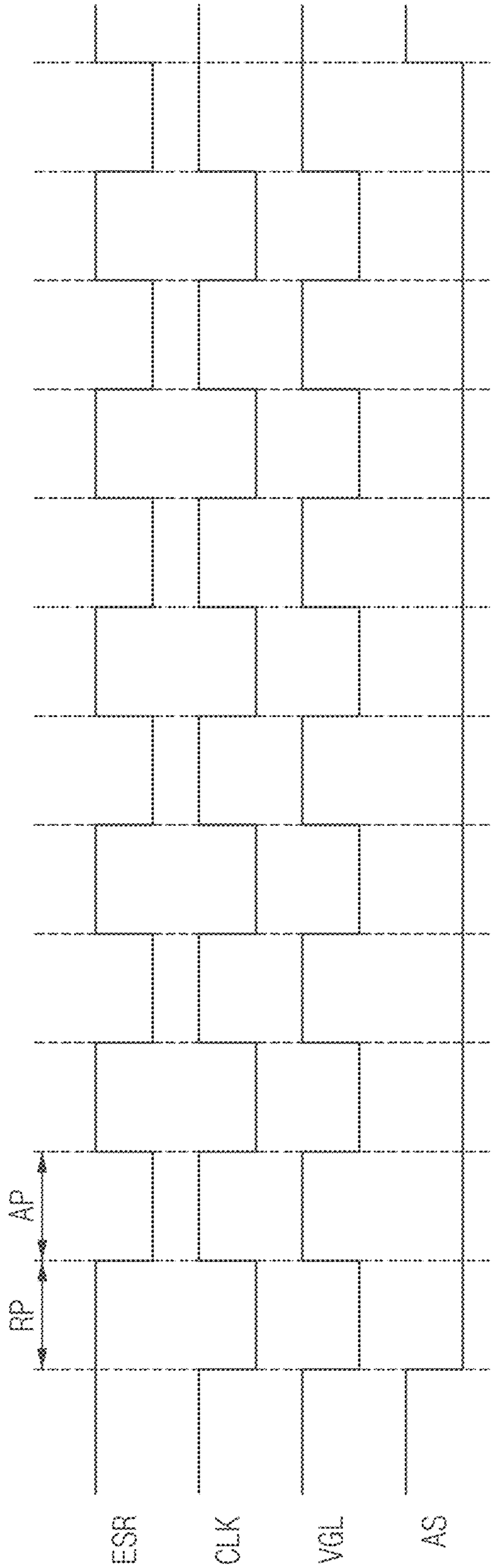
FIG. 15 is a timing diagram illustrating an example of an aging operation of the stage of FIG. 14.

FIG. 15 is a timing diagram illustrating an example of an aging operation of the stage 300 of FIG. 14.

Referring to FIGS. 1, 2, 14, and 15, the aging operation may be performed when the aging signal AS has a low voltage level.

In a reset period RP, the global control signal ESR may have a high voltage level, the clock signal CLK may have the low voltage level, the low gate voltage VGL may have the low voltage level, and the aging signal AS may have the low voltage level.

In an aging period AP after the reset period RP, the global control signal ESR may have the low voltage level, the clock signal CLK may have the high voltage level, the low gate voltage VGL may have the high voltage level, and the aging signal AS may have the low voltage level.

Figure 16:
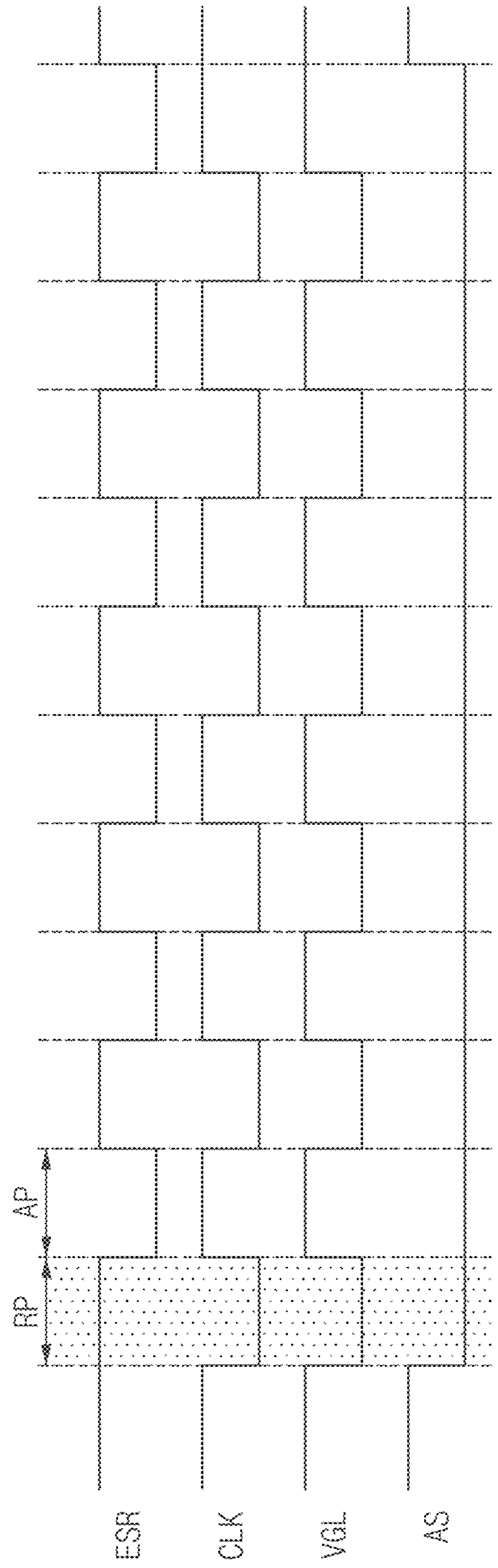
FIG. 16 is a timing diagram illustrating an example of the stage of FIG. 14 operating in a reset period of FIG. 15.

FIG. 16 is a timing diagram illustrating an example of the stage 300 of FIG. 14 operating in the reset period RP of FIG.

Figure 17:
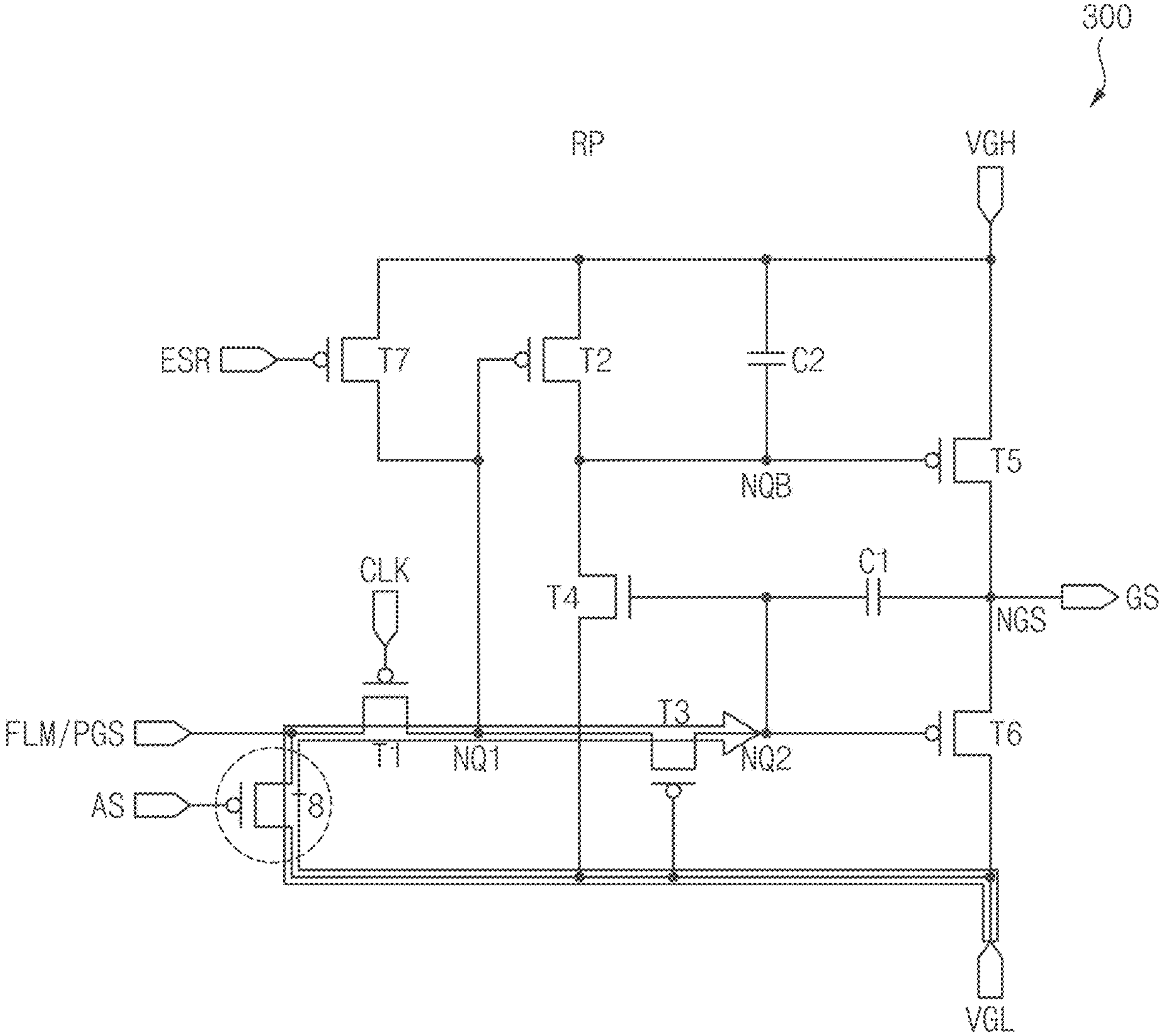
FIG. 17 is a circuit diagram illustrating an example of the stage of FIG. 14 operating in the reset period of FIG. 15.

15. FIG. 17 is a circuit diagram illustrating an example of the stage 300 of FIG. 14 operating in the reset period RP of FIG. 15.

Referring to FIGS. 1, 2, and 14 to 17, in the reset period RP, the global control signal ESR may have the high voltage level, and the clock signal CLK may have the low voltage level, the low gate voltage VGL may have the low voltage level, and the aging signal AS may have the low voltage level.

The eighth transistor T8 may be turned on in response to the aging signal AS having the low voltage level. The eighth transistor T8 may provide the low voltage level of the low gate voltage VGL to the first electrode of the first transistor T1, and the first electrode of the first transistor T1 may have the low voltage level of the low gate voltage VGL.

The first transistor T1 may be turned on in response to the clock signal CLK having the low voltage level. The first transistor T1 may provide a voltage of the first electrode of the first transistor T1 to the first control node NQ1, and the first control node NQ1 may have the low voltage level of the low gate voltage VGL.

The third transistor T3 may be turned on in response to the low gate voltage VGL having the low voltage level. The third transistor T3 may provide the voltage of the first control node NQ1 to the second control node NQ2, and the second control node NQ2 may have the low voltage level of the low gate voltage VGL.

As such, in the reset period RP, the first electrode of the first transistor T1, the first control node NQ1, and the second control node NQ2 may be reset to the low voltage level of the low gate voltage VGL.

Figure 18:
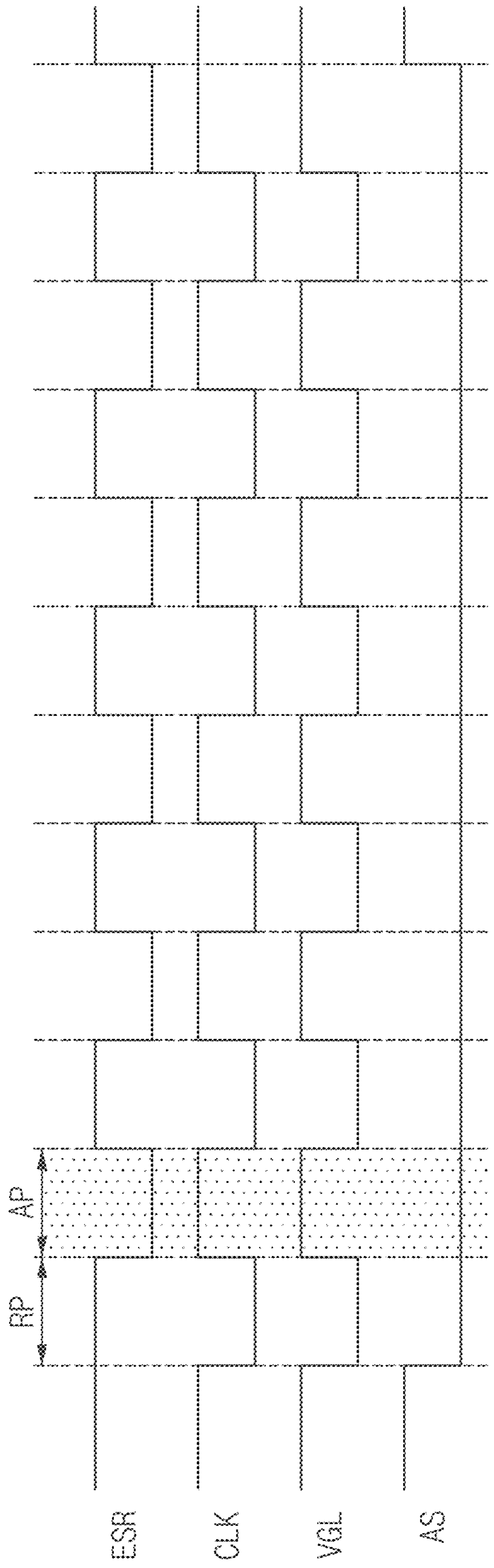
FIG. 18 is a timing diagram illustrating an example of the stage of FIG. 14 operating in an aging period of FIG. 15.
Figure 19:
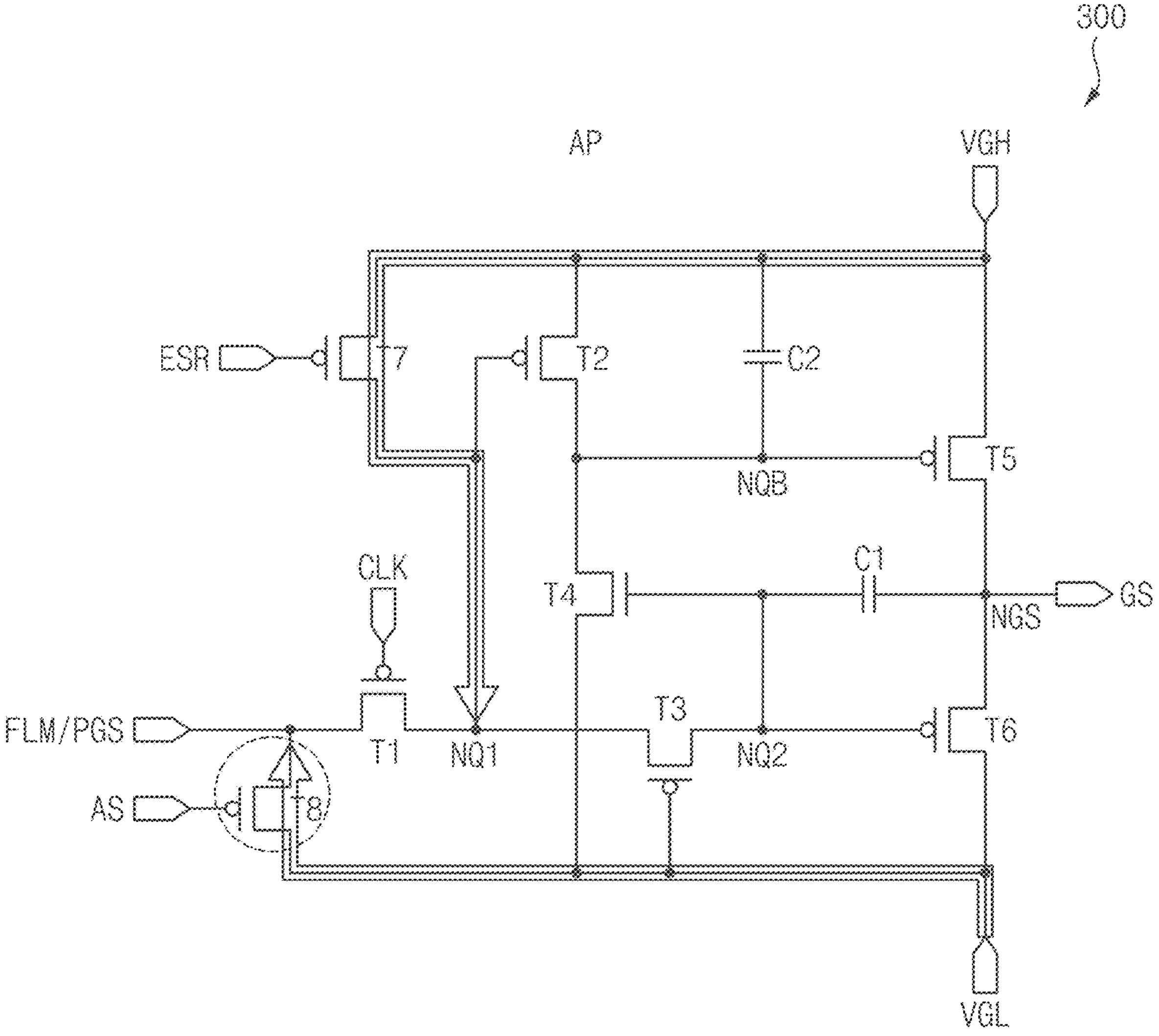
FIG. 19 is a circuit diagram illustrating an example of the stage of FIG. 14 operating in the aging period of FIG. 15.

FIG. 18 is a timing diagram illustrating an example of the stage 300 of FIG. 14 operating in the aging period AP of FIG. 15. FIG. 19 is a circuit diagram illustrating an example of the stage 300 of FIG. 14 operating in the aging period AP of FIG. 15.

Referring to FIGS. 1, 2, and 14 to 19, in the aging period AP, the global control signal ESR may have the low voltage level, the clock signal CLK may have the high voltage level, the low gate voltage VGL may have the high voltage level, and the aging signal AS may have the low voltage level.

The first transistor T1 may be turned off in response to the clock signal CLK having the high voltage level, and the third transistor T3 may be turned off in response to the high voltage level of the low gate voltage VGL.

The eighth transistor T8 may be turned on in response to the aging signal AS having the low voltage level. The eighth transistor T8 may provide the high voltage level of the low gate voltage VGL to the first electrode of the first transistor T1, and the first electrode of the first transistor T1 may have the high voltage level of the low gate voltage VGL.

The seventh transistor T7 may be turned on in response to the global control signal ESR having the low voltage level. The seventh transistor T7 may provide the high gate voltage VGH to the first control node NQ1, and the first control node NQ1 may have the high gate voltage VGH.

As such, the first transistor T1 may turned off, a gate-source voltage of the first transistor T1 may have a positive value, and a drain-source voltage of the first transistor T1 may have the positive value, such that the aging operation may be performed on the first transistor T1. Additionally, the third transistor T3 may be turned off, a gate-source voltage of the third transistor T3 may have the positive value, and a drain-source voltage of the third transistor T3 may have the positive value, such that the aging operation may be performed on the third transistor T3.

The aging operation may be performed on the first transistor T1 and the third transistor T3, such that the leakage current may be prevented or substantially prevented, and a reliability of the gate driver 130 may be improved.

Figure 20:
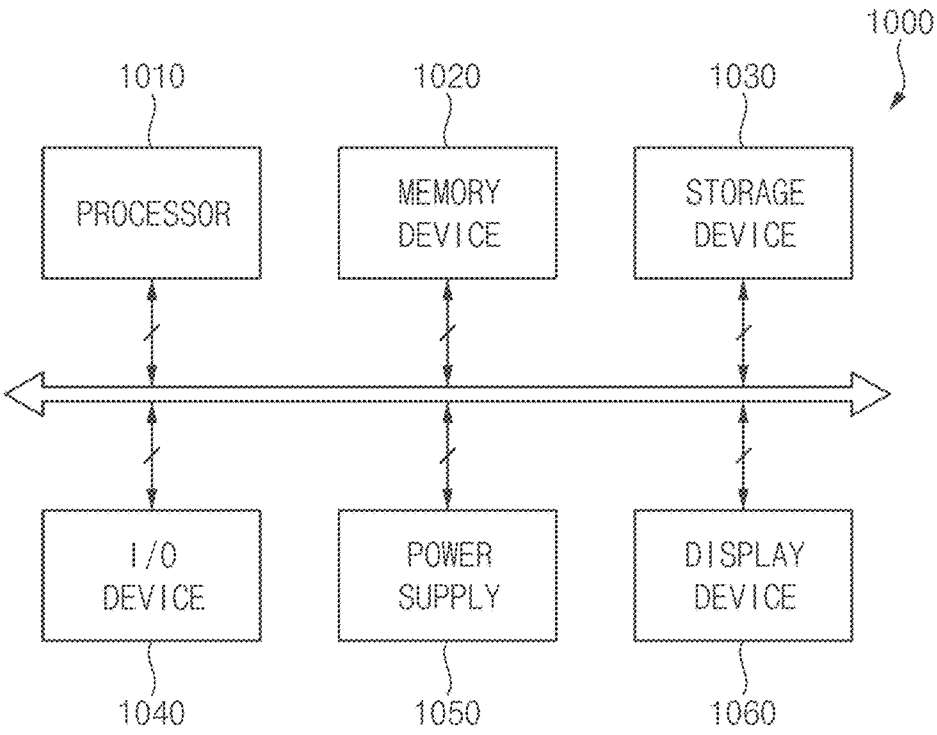
FIG. 20 is a block diagram illustrating an electronic device.
Figure 21:
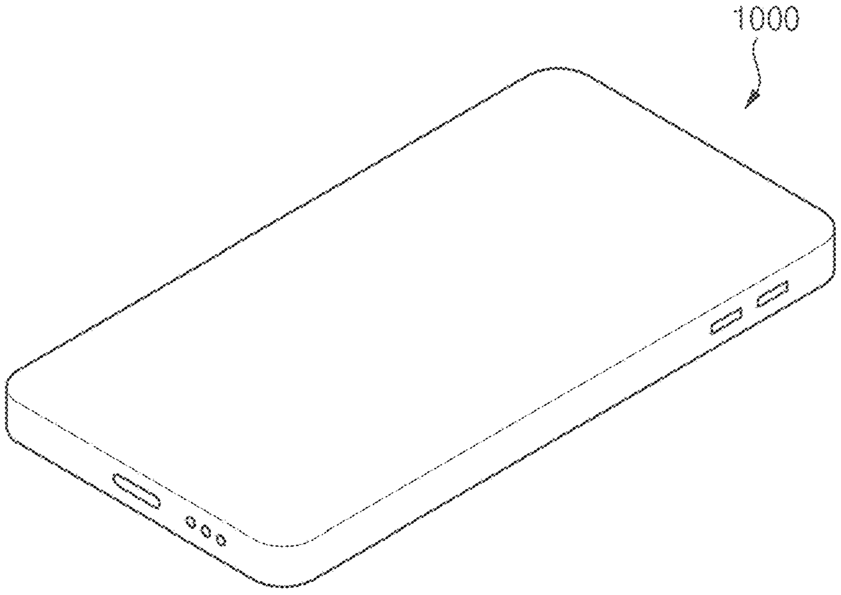
FIG. 21 is a view illustrating an example of the electronic device of FIG. 20 implemented as a smart phone.

FIG. 20 is a block diagram illustrating an electronic device. FIG. 21 is a view illustrating an example of the electronic device of FIG. 20 implemented as a smart phone.

Referring to FIGS. 20 and 21, the electronic device 1000 may include a processor 1010, a memory device 1020, a storage device 1030, an input/output (I/O) device 1040, a power supply 1050, and a display device 1060. The display device 1060 may be the display device 10 described above with reference to FIG. 1. In addition, the electronic device 1000 may further include a plurality of ports for communicating with a video card, a sound card, a memory card, a universal serial bus (USB) device, another electronic device, and the like.

In an embodiment, as illustrated in FIG. 21, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro-processor, a central processing unit (CPU), an application processor (AP), and the like. The processor 1010 may be connected to (e.g., coupled to) other components via an address bus, a control bus, a data bus, and the like. Further, the processor 1010 may be connected to (e.g., coupled to) an extended bus such as a peripheral component interconnection (PCI) bus.

The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like, and/or at least one volatile memory device, such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, and the like.

The I/O device 1040 may include an input device, such as a keyboard, a keypad, a mouse device, a touch-pad, a touch-screen, and the like, and an output device, such as a printer, a speaker, and the like. In some embodiments, the I/O device 1040 may include the display device 1060.

The power supply 1050 may provide power for the operations of the electronic device 1000.

The display device 1060 may be connected to other components through buses or other communication links.

Embodiments of the present disclosure described above may be applied to any suitable display device and any suitable electronic device including a touch panel. For example, embodiments of the present disclosure may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, and the like.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A gate driver comprising a plurality of stages, each of the plurality of stages comprising:

a first transistor comprising:

a gate electrode configured to receive a clock signal;

a first electrode configured to receive an input signal; and a second electrode connected to a first control node;

a third transistor comprising:

a gate electrode configured to receive a low gate voltage;

a first electrode connected to the first control node; and a second electrode connected to a second control node;

a fifth transistor comprising:

a gate electrode connected to an inverting control node;

a first electrode configured to receive a high gate voltage; and a second electrode connected to a gate output node configured to output a gate signal;

a sixth transistor comprising:

a gate electrode connected to the second control node;

a first electrode configured to receive the low gate voltage; and a second electrode connected to the gate output node;

a seventh transistor comprising:

a gate electrode configured to receive a global control signal;

a first electrode configured to receive the high gate voltage; and a second electrode connected to the first control node; and an eighth transistor comprising:

a gate electrode configured to receive an aging signal;

a first electrode configured to receive an aging voltage; and a second electrode connected to the first electrode of the first transistor.

2. The gate driver of claim 1, wherein each of the plurality of stages further comprises:

a first capacitor comprising a first electrode connected to the second control node, and a second electrode connected to the gate output node; and a second capacitor comprising a first electrode configured to receive the high gate voltage, and a second electrode connected to the inverting control node.

3. The gate driver of claim 2, wherein each of the plurality of stages further comprises a second transistor comprising:

a gate electrode connected to the first control node;

a first electrode configured to receive the high gate voltage; and a second electrode connected to the inverting control node.

4. The gate driver of claim 3, wherein each of the plurality of stages further comprises a fourth transistor comprising:

a gate electrode connected to the second control node;

a first electrode configured to receive the low gate voltage; and a second electrode connected to the inverting control node.

5. The gate driver of claim 4, wherein the fourth transistor is an N-type transistor, and the first transistor, the second transistor, the third transistor, the fifth transistor, the sixth transistor, and the seventh transistor are P-type transistors.

6. The gate driver of claim 1, wherein the aging voltage is greater than a low voltage level of the clock signal and a low voltage level of the low gate voltage.

7. The gate driver of claim 1, wherein, in a first reset period, the global control signal has a high voltage level, the clock signal has a low voltage level, the low gate voltage has a low voltage level, and the aging signal has a low voltage level.

8. The gate driver of claim 7, wherein, in the first reset period, the eighth transistor is configured to provide the aging voltage to the first electrode of the first transistor, the first transistor is configured to provide a voltage of the first electrode of the first transistor to the first control node, and the third transistor is configured to provide a voltage of the first control node to the second control node.

9. The gate driver of claim 7, wherein, in a first aging period after the first reset period, the global control signal has the low voltage level, the clock signal has the high voltage level, the low gate voltage has the low voltage level, and the aging signal has the low voltage level.

10. The gate driver of claim 9, wherein, in the first aging period, the seventh transistor is configured to provide the high gate voltage to the first control node, and the eighth transistor is configured to provide the aging voltage to the first electrode of the first transistor.

11. The gate driver of claim 9, wherein, in a second reset period after the first aging period, the global control signal has the high voltage level, the clock signal has the low voltage level, the low gate voltage has the low voltage level, and the aging signal has the low voltage level.

12. The gate driver of claim 11, wherein, in the second reset period, the eighth transistor is configured to provide the aging voltage to the first electrode of the first transistor, the first transistor is configured to provide a voltage of the first electrode of the first transistor to the first control node, and the third transistor is configured to provide a voltage of the first control node to the second control node.

13. The gate driver of claim 11, wherein, in a second aging period after the second reset period, the global control signal has the low voltage level, the clock signal has the high voltage level, the low gate voltage has the high voltage level, and the aging signal has the low voltage level.

14. The gate driver of claim 13, wherein, in the second aging period, the seventh transistor is configured to provide the high gate voltage to the first control node.

15. The gate driver of claim 7, wherein, in a first aging period after the first reset period, the global control signal has the low voltage level, the clock signal has the high voltage level, the low gate voltage has the high voltage level, and the aging signal has the low voltage level.

16. The gate driver of claim 15, wherein, in a second reset period after the first aging period, the global control signal has the high voltage level, the clock signal has the low voltage level, the low gate voltage has the low voltage level, and the aging signal has the low voltage level.

17. The gate driver of claim 16, wherein, in a second aging period after the second reset period, the global control signal has the low voltage level, the clock signal has the high voltage level, the low gate voltage has the low voltage level, and the aging signal has the low voltage level.

18. The gate driver of claim 1, wherein an aging operation for the first transistor and the third transistor is performed in a process operation or in a driving operation.

19. A gate driver comprising a plurality of stages, each of the plurality of stages comprising:

- a first transistor comprising:
  - a gate electrode configured to receive a clock signal;
  - a first electrode configured to receive an input signal; and
  - a second electrode connected to a first control node;
- a third transistor comprising:
  - a gate electrode configured to receive a low gate voltage;
  - a first electrode connected to the first control node; and
  - a second electrode connected to a second control node;
- a fifth transistor comprising:
  - a gate electrode connected to an inverting control node;
  - a first electrode configured to receive a high gate voltage; and
  - a second electrode connected to a gate output node configured to output
- a gate signal;
- a sixth transistor comprising:
  - a gate electrode connected to the second control node;
  - a first electrode configured to receive the low gate voltage; and
  - a second electrode connected to the gate output node;
- a seventh transistor comprising:
  - a gate electrode configured to receive a global control signal;
  - a first electrode configured to receive the high gate voltage; and
  - a second electrode connected to the first control node; and
- an eighth transistor comprising:
  - a gate electrode configured to receive an aging signal;
  - a first electrode configured to receive the low gate voltage; and
  - a second electrode connected to the first electrode of the first transistor.

20. The gate driver of claim 19, wherein, in a reset period, the global control signal has a high voltage level, the clock signal has a low voltage level, the low gate voltage has a low voltage level, and the aging signal has a low voltage level.

21. The gate driver of claim 20, wherein, in the reset period, the eighth transistor is configured to provide the low voltage level of the low gate voltage to the first electrode of the first transistor, the first transistor is configured to provide a voltage of the first electrode of the first transistor to the first control node, and the third transistor is configured to provide a voltage of the first control node to the second control node.

22. The gate driver of claim 20, wherein, in an aging period after the reset period, the global control signal has the low voltage level, the clock signal has the high voltage level, the low gate voltage has the high voltage level, and the aging signal has the low voltage level.

23. The gate driver of claim 22, wherein, in the aging period, the seventh transistor is configured to provide the high gate voltage to the first control node, and the eighth transistor is configured to provide the high voltage level of the low gate voltage to the first electrode of the first transistor.

24. The gate driver of claim 19, wherein an aging operation for the first transistor and the third transistor is performed in a process operation or a driving operation.

25. A display device comprising:

- a display panel comprising a plurality of pixels; and
- a gate driver comprising a plurality of stages configured to provide gate signals to the pixels, each of the plurality of stages comprising:
  - a first transistor comprising a gate electrode configured to receive a clock signal, a first electrode configured to receive an input signal, and a second electrode connected to a first control node;
  - a third transistor comprising a gate electrode configured to receive a low gate voltage, a first electrode connected to the first control node, and a second electrode connected to a second control node;
  - a fifth transistor comprising a gate electrode connected to an inverting control node, a first electrode configured to receive a high gate voltage, and a second electrode connected to a gate output node configured to output a gate signal from among the gate signals;
  - a sixth transistor comprising a gate electrode connected to the second control node, a first electrode configured to receive the low gate voltage, and a second electrode connected to the gate output node;
  - a seventh transistor comprising a gate electrode configured to receive a global control signal, a first electrode configured to receive the high gate voltage, and a second electrode connected to the first control node; and
  - an eighth transistor comprising a gate electrode configured to receive an aging signal, a first electrode configured to receive an aging voltage, and a second electrode connected to the first electrode of the first transistor.

* * * * *